United States Patent [19]
Hutchison et al.

[11] 3,982,324
[45] Sept. 28, 1976

[54] METHOD OF DETERMINING ACTUAL SIZE OF FLOW OPENINGS IN A TUBULAR MEMBER LOCATED IN A WELL

[75] Inventors: Stanley O. Hutchison, Bakersfield; Glenn W. Anderson, Oildale, both of Calif.

[73] Assignee: Chevron Research Company, San Francisco, Calif.

[22] Filed: Dec. 23, 1974

[21] Appl. No.: 535,777

[52] U.S. Cl. .................................. 33/302; 33/178 F; 73/151
[51] Int. Cl.² .......................................... E21B 47/00
[58] Field of Search .................. 33/302, 303, 178 F; 73/151

[56] References Cited
UNITED STATES PATENTS

| | | | |
|---|---|---|---|
| 2,416,441 | 2/1947 | Grant et al. | 73/151 |
| 2,653,474 | 10/1953 | Santiago | 73/151 |

*Primary Examiner*—Richard E. Aegerter
*Assistant Examiner*—Willis Little
*Attorney, Agent, or Firm*—R. L. Freeland, Jr.; E. J. Keeling

[57] ABSTRACT

A method of using an impression element to determine the actual size of a flow opening in a tubular member located in a well by comparing an extrusion formed on the impression element with calibrated data on extrusion size vs. actual hole size.

2 Claims, 46 Drawing Figures

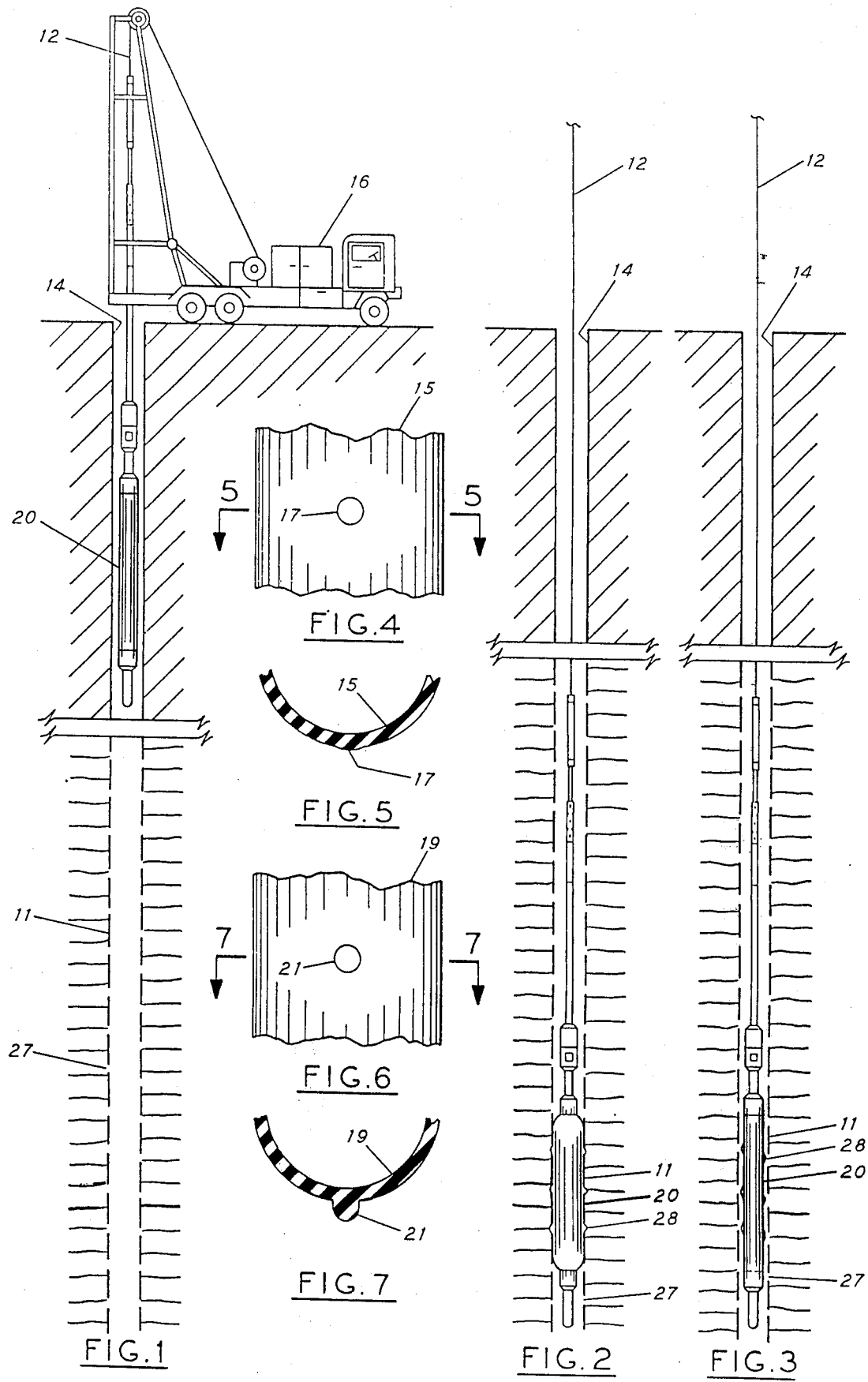

_3,982,324_

METHOD OF DETERMINING ACTUAL SIZE OF FLOW OPENINGS IN A TUBULAR MEMBER LOCATED IN A WELL

RELATED APPLICATIONS

This application is related to the following applications: Ser. No. 367,602, filed June 4, 1973; Ser. No. 373,341, filed June 25, 1973; Ser. No. 373,342, filed June 25, 1973; Ser. No. 373,343, filed June 25, 1973; Ser. No. 423,593, filed Dec. 10, 1973; Ser. No. 430,326, filed Jan. 2, 1974; Ser. No. 510,260, filed Sept. 30, 1974; Ser. No. 510,264, filed Sept. 30, 1974 and Ser. No. 510,265, filed Sept. 30, 1974. The content of these applications is hereby incorporated herein by reference.

BACKGROUND OF THE INVENTION

This invention relates to a method of using an impression element to determine the actual size of a flow opening in a tubular member located in a well. More particularly, this invention relates to using an inflatable impression packer having an inflatable sleeve containing an impression element to contact a flow opening in a tubular member positioned in a well to form an extrusion representative of said flow opening and to determine the actual size of said flow opening by comparing said extrusion with calibrated test extrusion data.

In well operations and in particular oil well operations it is common practice to place a tubular member such as a well liner or casing in the well adjacent a producing formation. The tubular member is provided with relatively small fluid flow openings which are designed to permit flow of fluids from the formation into the well or from the well into the formation without permitting said or other fines to enter the well. The flow openings in the tubular member may be slots precut in the tubular member before it is positioned in the well or the flow openings may be perforations made in a tubular member after it has been run in the well. The tubular member is usually cemented into place in the well adjacent a desired formation. It is often necessary to know the actual size of the flow opening. This is particularly true when the flow opening was made by gun or jet perforation techniques after the tubular member had been positioned in the well. It is also sometimes desirable to know the actual size of a precut slot which may have been changed in size due to erosion or plugging. Heretofore impression packers have been used to obtain this type of information. It has been found, however, that an impression packer does not always give accurate information regarding hole size. The present invention is directed to determining the actual size of a flow opening located in a tubular member positioned in a well.

The present method is directed to a method of determining actual size of a flow opening in a well tubular member from an extrusion of impression material obtained by forcing the impression material into the flow opening. The inner diameter of a well tubular member having a flow opening therein is determined. The temperature in the well tubular member adjacent the flow opening is also determined. Surface test apparatus including a test tubular member having a plurality of test flow openings of different sizes formed therein is used to obtain calibrated data on flow opening size. The temperature of the test tubular member is adjusted to a value substantially equal to the well tubular member. A test inflatable impression packer having known operating characteristics and dimensions is inflated for a known pressure for a known time in the test tubular member to extrude impression material into the plurality of test flow openings to obtain a plurality of test extrusions of impression material on the test inflatable impression packer. The test inflatable impression packer is deflated and the size of said test extrusions is measured when the packer is deflated. The measured size of the test extrusions is correlated to the actual size of the test flow openings. A working inflatable impression packer having substantially the same operating characteristics and dimensions as the test inflatable impression packer is run into the well adjacent the well tubular member. The working inflatable impression packer is inflated to substantially the same pressure and for substantially the same time as the test inflatable impression packer to form a well extrusion by extruding impression material into the flow opening of the well tubular member. The working inflatable impression packer is deflated and removed from the well. The actual size of the flow opening in the well tubular member is determined by comparing the well extrusion to the data obtained by calibration of the test extrusion to actual size of the test flow openings.

A desirable embodiment of components useful in the practice of the invention include an inflatable impression packer having an inflatable sleeve containing an impression element on at least a portion of its outer surface. The inflatable packer having the inflatable sleeve containing an impression element on at least a portion of its outer surface is lowered into the well and positioned with the impression element adjacent a fluid flow opening in a tubular member which is positioned under liquid adjacent a formation penetrated by the well. The inflatable sleeve is inflated to contact the tubular member over the flow opening with the impression element at a predetermined pressure and for a predetermined time, which is normally sufficient to cause the impression element to be at least partially extruded into the opening. The sleeve is deflated to remove the impression element from contact with the tubular member. The inflatable packer is withdraw from the well and the extrusion on the impression element is compared with calibrated data of test extrusions to actual flow opening sized to determine the actual size of the flow opening in the well tubular member.

OBJECTS OF THE INVENTION

The principal object of the present invention is to provide a well operator with information concerning the actual size of a flow opening in a tubular member positioned in a well adjacent an underground formation. Further objects and advantages of the present invention will become apparent from the following detailed description read in light of the accompanying drawings which are made a part of this specification.

BRIEF DESCRIPTION OF THE DRAWINGS

FIG. 1 through FIG. 3 inclusive are elevation views, partially in section, illustrating one form of apparatus being run on wire line through a series of sequential operations performed in a well to obtain an impression record therefrom in accordance with the present invention;

FIG. 4 is an elevation view of a portion of an impression element showing an impression of a flow opening being formed.

FIG. 5 is a sectional view taken at line 5—5 of FIG. 4;

FIG. 6 is an elevation view of a portion of an impression element showing an impression of a flow opening suitable for use in accordance with the invention;

FIG. 7 is a section view taken at line 7—7 of FIG. 6; and

DETAILED DESCRIPTION OF THE INVENTION

Figure 8:
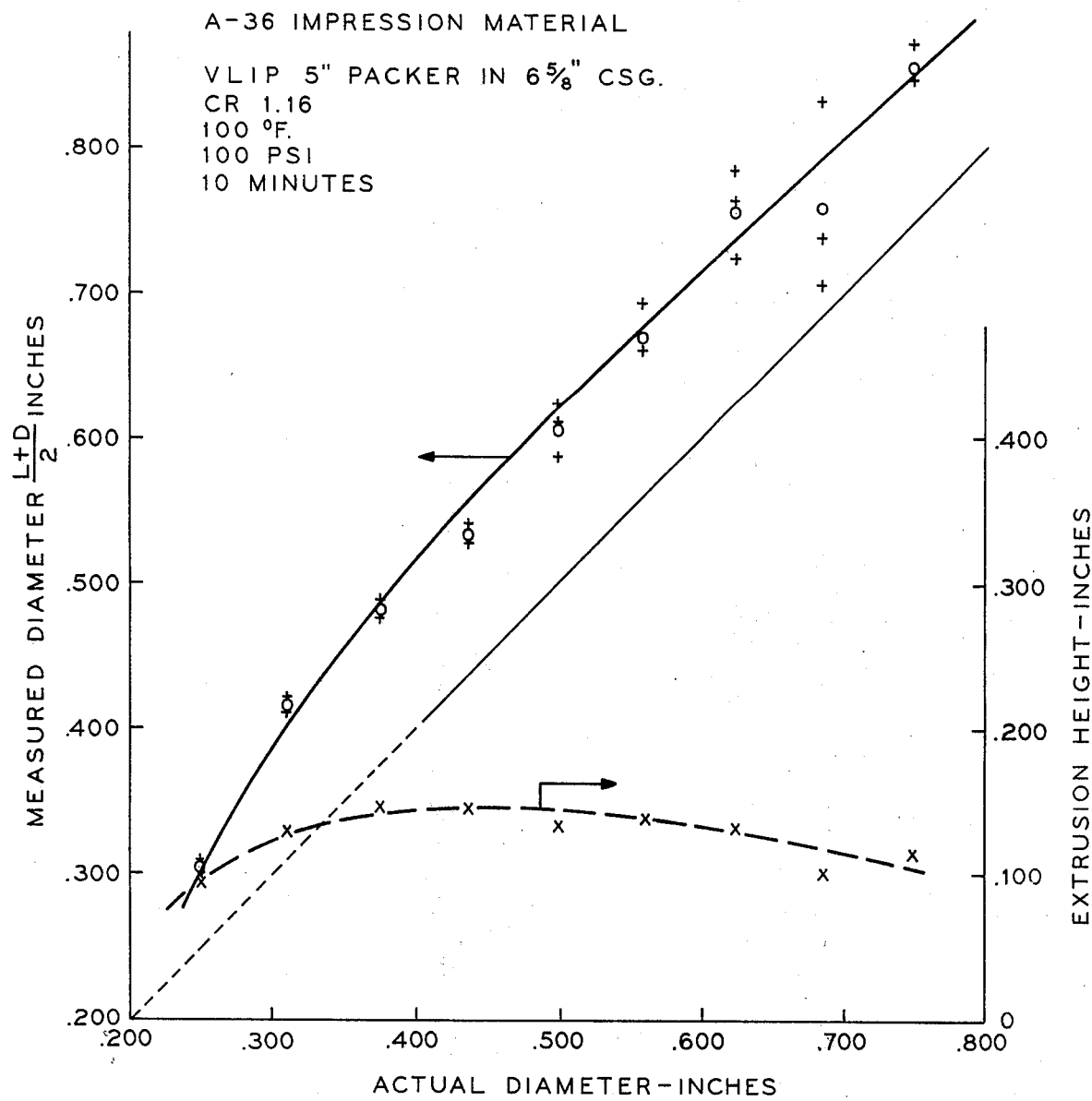
FIG. 8 through FIG. 46, inclusive, are curves showing measured diameter vs. actual diameter of flow openings under different test conditions.

FIGS. 1 through 3 illustrate an inflatable packer having an inflatable sleeve containing an impression element during an operational sequence in a well utilizing the impression sleeve to obtain information from the well. The apparatus shown in FIGS. 1-3 is a wire line inflatable packer. It is readily apparent, however, that other modes of apparatus may be utilized to contact the impression element with the tubular member positioned in the well. FIG. 1 shows the wire line inflatable impression packer, illustrated generally by the number 20, hung on wire line 12 in a well 14. A suitable hoist truck 16 is used to run the packer 20 in and out of the well. The inflatable impression packer 20 includes an inflatable sleeve portion and a control portion for inflating and deflating the sleeve.

The wire line inflatable packer 20 is lowered into the well on wire line to a position such as is shown in FIG. 2 from where it is desired to obtain an impression from the well wall. Prior to lowering the wire line inflatable packer 20 into the well a sequencing timer actuating means contained within the control portion of the inflatable packer 20 is activated to begin an automatic sequence of inflation and deflation of the inflatable sleeve of the packer. Thus after elapse of a predetermined time which is of sufficient duration to permit positioning the wire line inflatable impression packer at the desired depth in the well the timer actuating means initiates operation of the inflatable sleeve of the packer and, as shown in FIG. 2, causes it to inflate and press the impression element against a tubular member 11. The impression element on the outside of the inflatable sleeve of the packer is pressed into flow openings 27 which may be slots or perforations to form lasting extrusions 28 on the impression element. From the extrusions on such an element information regarding the actual size of the flow openings in the tubular means can be obtained. After a predetermined time has passed the sequencing timer actuation means operates the valve means of the packer to deflate the inflatable sleeve and to remove the impression element from the tubular member as indicated in FIG. 3. The inflatable wire line packer 20 is then returned to the surface by the wire line 12. The extrusions on the impression element are inspected and compared with calibrated data on actual opening size vs. test extrusion size to obtain the actual flow opening size of the holes in the tubular member 11.

FIG. 4 and FIG. 5 illustrate an impression element 15 which has contacted a tubular member over a flow opening. The impression element 15 was forced against the flow opening and an outline 17 of the flow opening, which in this case is perforation, is beginning to form. It is preferred, however, to have a much more pronounced extrusion to measure in accordance with the invention.

FIG. 6 and FIG. 7 illustrate an impression element 19 which has contacted a tubular member over a flow opening for a time and at a pressure to give an extrusion suitable for use in the present invention. The impression element 19 was forced against the flow opening for a time and at a pressure which would normally cause the impression material to at least partially extrude into the opening. There is an extrusion 21 of the impression material which flowed into the flow opening and which is suitable for use in the invention.

Thus, in accordance with the invention a method is provided for determining actual size of a flow opening in a well tubular member from an extrusion of impression material obtained by forcing the impression material into the flow opening. The inner diameter of a well tubular member having a flow opening therein is determined. The temperature in the well tubular member adjacent the flow opening is also determined. Surface test apparatus, including a test tubular member having a plurality of test flow openings of different sizes formed therein, is used to obtain calibrated data on flow opening size. The temperature of the test tubular member is adjusted to a value substantially equal to the well tubular member. A test inflatable impression packer having known operating characteristics and dimensions is inflated for a known pressure for a known time in the test tubular member to extrude impression material into the plurality of test flow openings to obtain a plurality of test extrusions of impression material on the test inflatable impression packer. The test inflatable impression packer is deflated and the size of said test extrusions is measured when the packer is deflated. The measured size of the test extrusions is correlated to the actual size of the test flow openings. A working inflatable impression packer having substantially the same operating characteristiccs and dimensions as the test inflatable impression packer is run into the well adjacent the well tubular member. The working inflatable impression packer is inflated to substantially the same pressure and for substantially the same time as the test inflatable impression packer to form a well extrusion by extruding impression material into the flow opening of the well tubular member. The working inflatable impression packer is deflated and removed from the well. The actual size of the flow opening in the well tubular member is determined by comparing the well extrusion to the data obtained by calibration of the test extrusion to actual size of the test flow openings.

In accordance with the invention a determination of actual flow opening size of holes in an underground tubular member is made by comparing extrusions taken in a well with calibrated extrusion data developed on the surface. The data include extrusion diameter vs. actual hole size obtained in test apparatus under conditions similar to those encountered in the well of interest. An equivalent inflatable impression packer is run in the test apparatus under simulated well conditions and well geometry. A series of holes of different known sizes are placed in the surface apparatus and an impression run of the same time and pressure as will be used downhole is done. The size of the extrusion of the impression material for each hole is correlated with acutal hole size. A plot of extrusion size vs. actual size may be made. A similar inflatable impression packer is then run in the well and operated at the same conditions as was the inflatable impression packer used in the surface apparatus. By comparing the extrusions obtained from the well with the calibrated data obtained from the surface apparatus runs information regarding the actual size of the flow openings of the downhole tubular member is obtained.

There are a number of suitable materials from which impression elements may be made. The impression element is often formed in a sheet and connected in a sleevelike manner to an inflatable sleeve of an inflatable packer. The impression sleeve is formed of a material which will expand and retract so that an impression may be extruded and then the packer may be removed from the well so the impression may be examined. The material used to form the impression element or sleeve must be smooth so that impression detail will be readily observable on the sleeve after a run of the impression packer. That is, the surface of the impression sleeve must not be so rough that detail of the impression is lost. Generally, a surface which feels smooth to the hand and visually appears to have no major roughness, is required.

Figure 9:
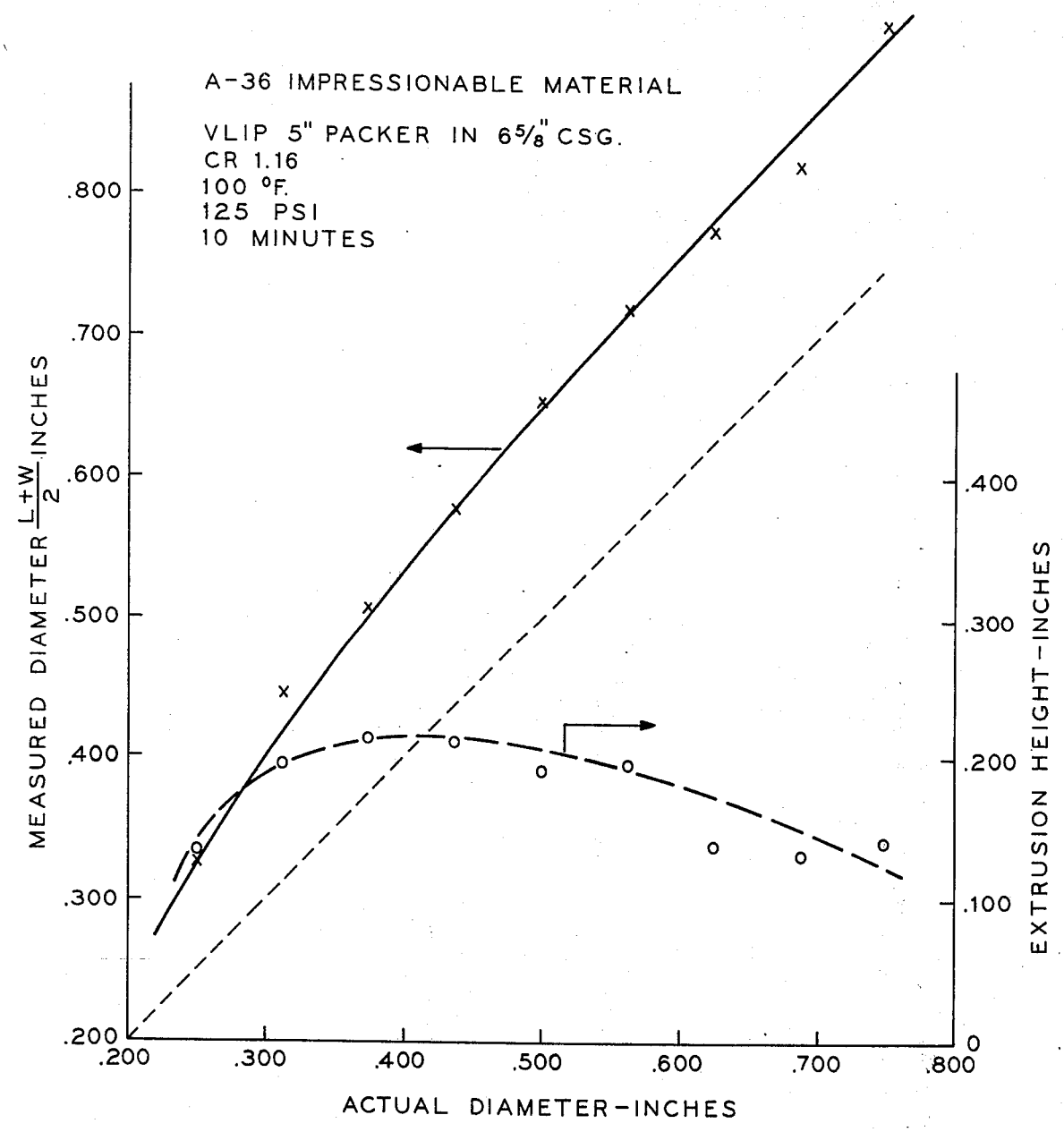
Figure 10:
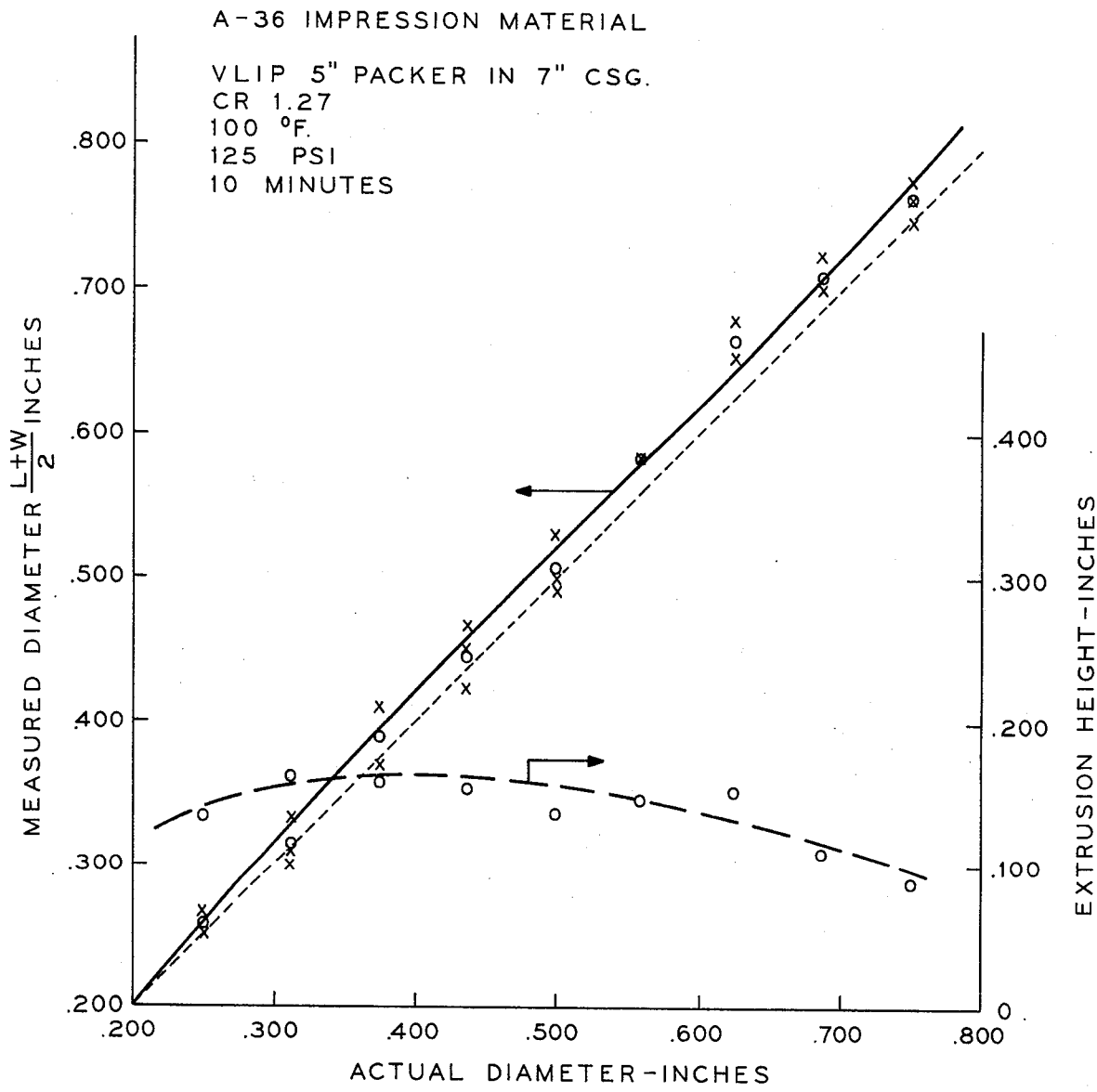
Figure 11:
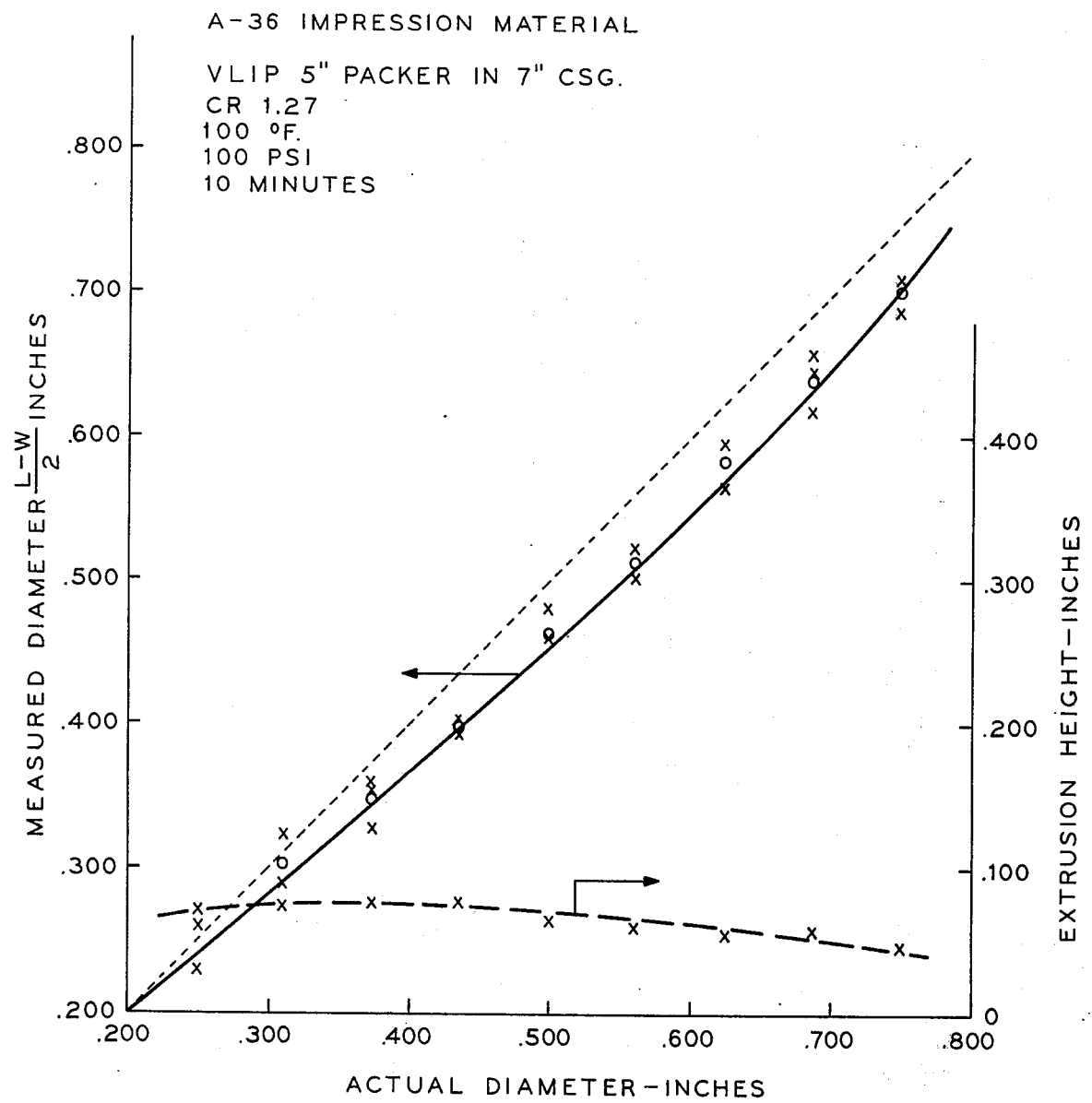
Figure 12:
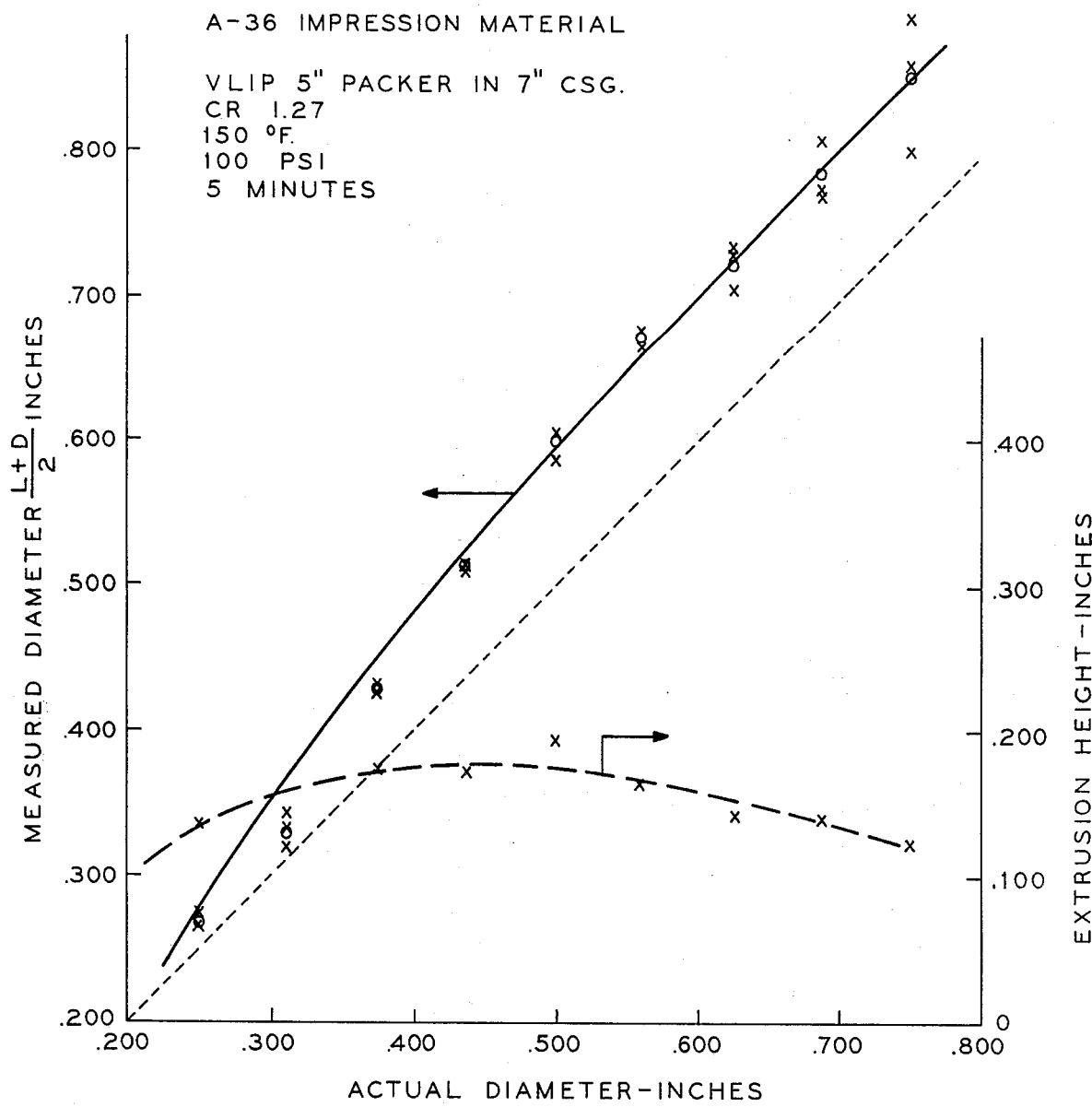
Figure 13:
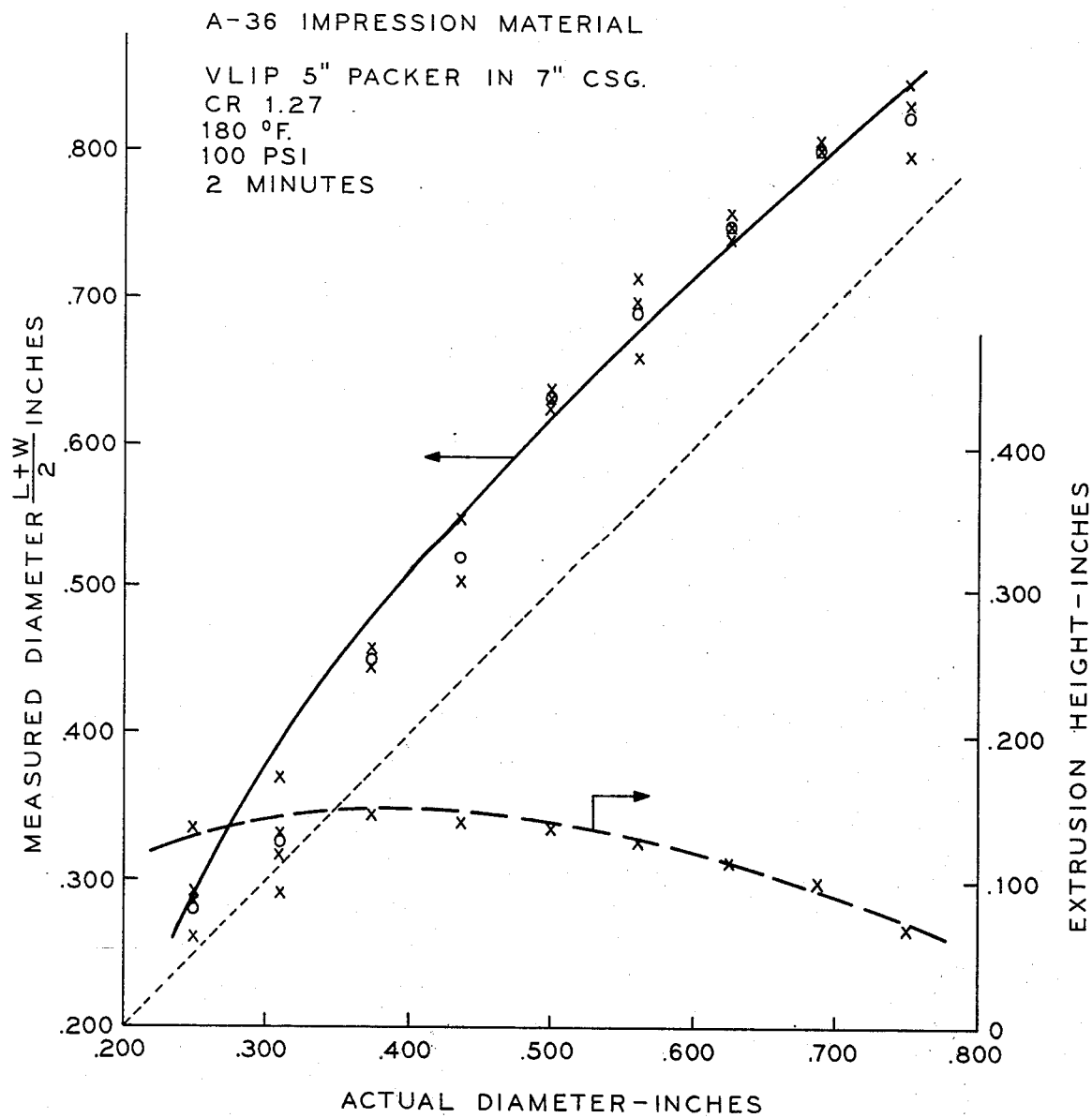
Figure 14:
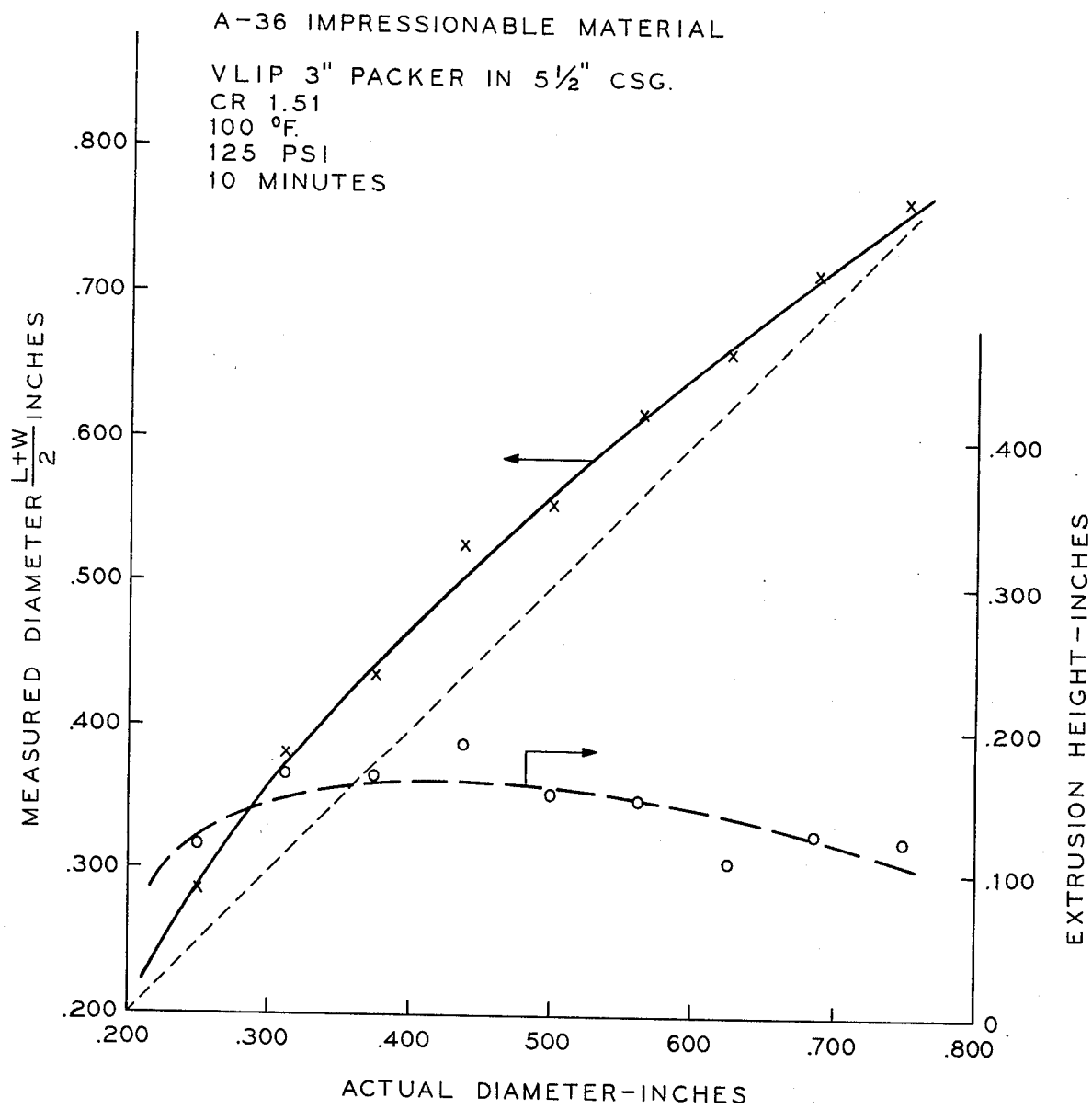
Figure 15:
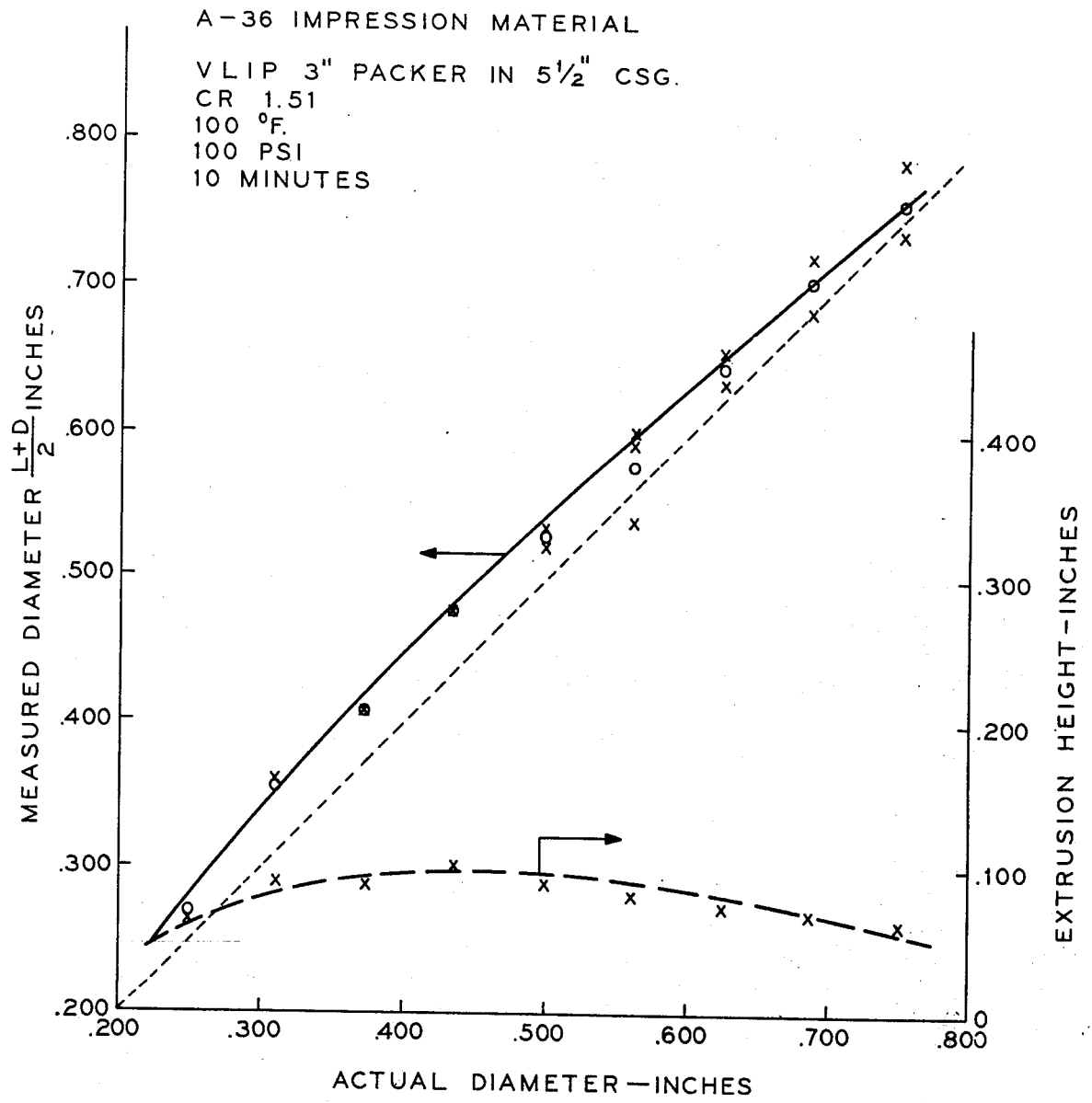
Figure 16:
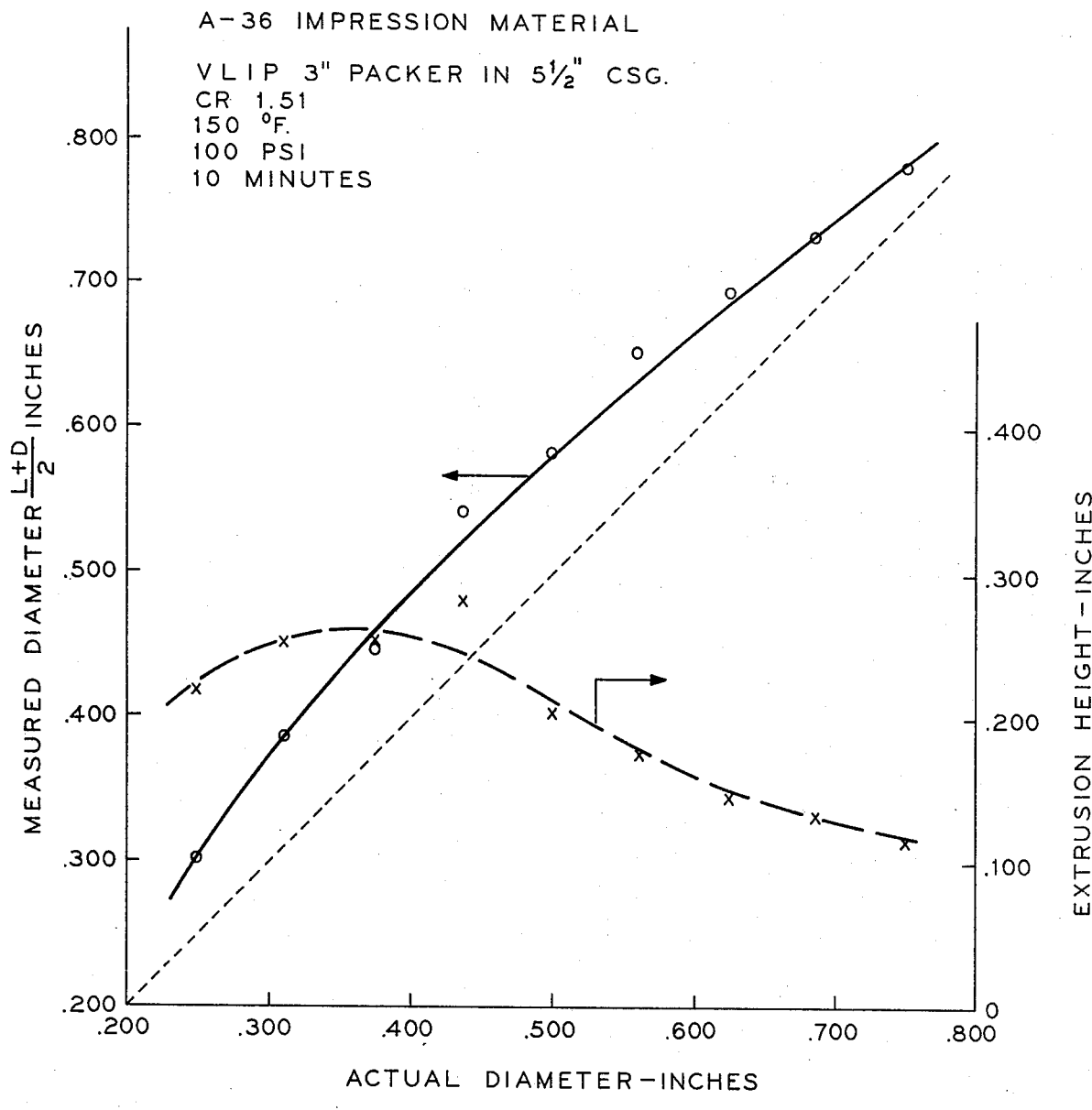
Figure 17:
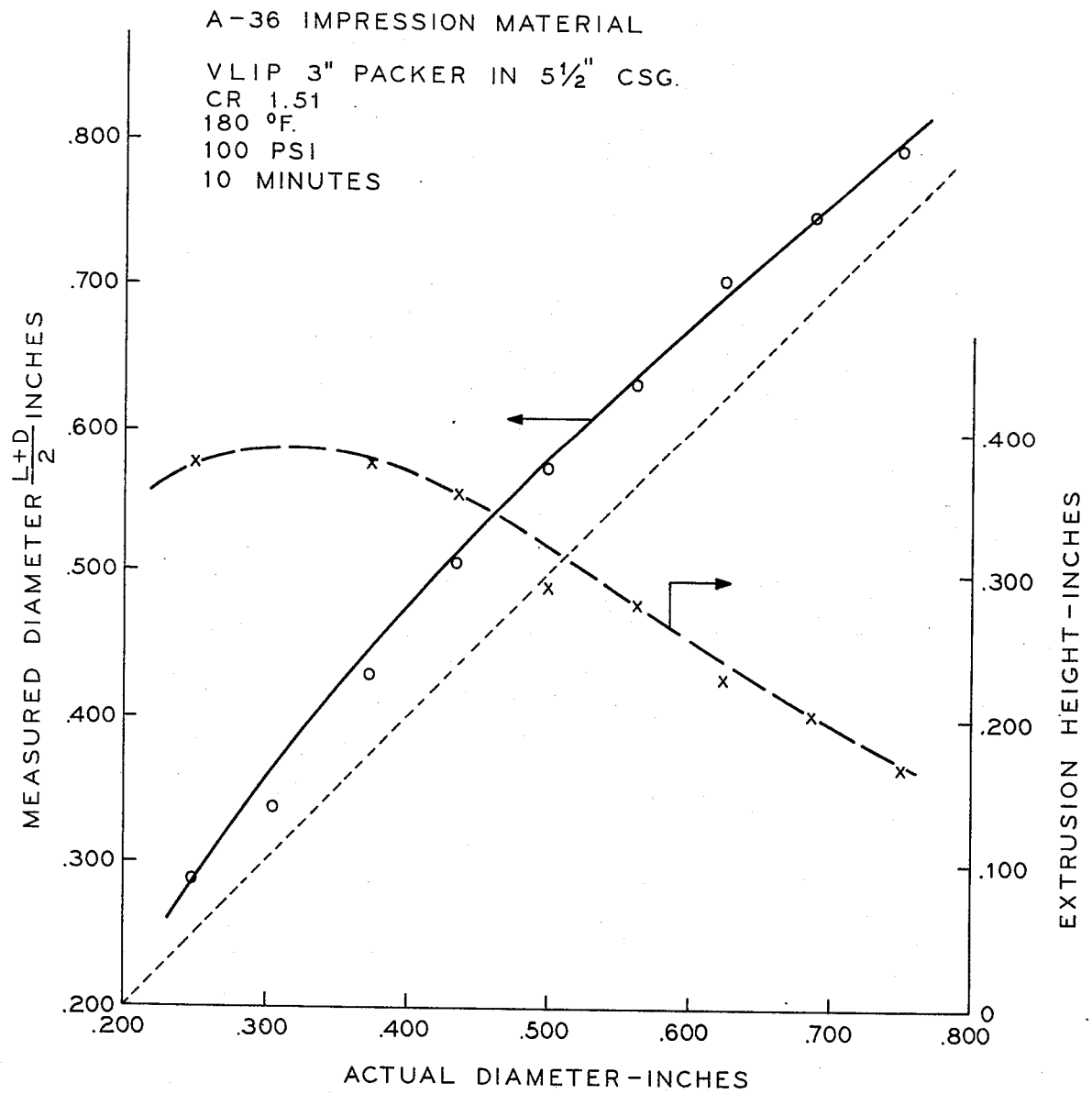
Figure 18:
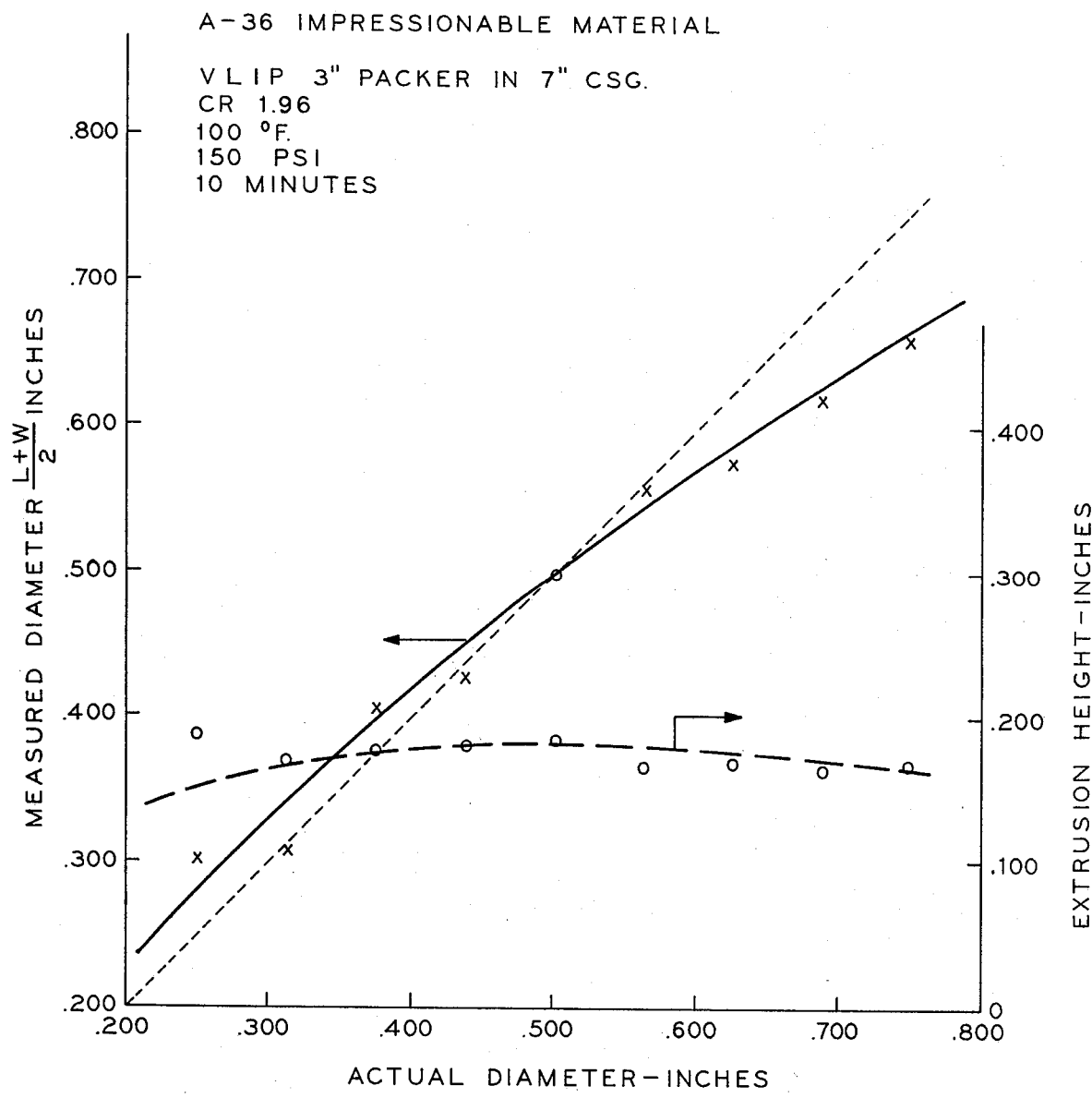
Figure 19:
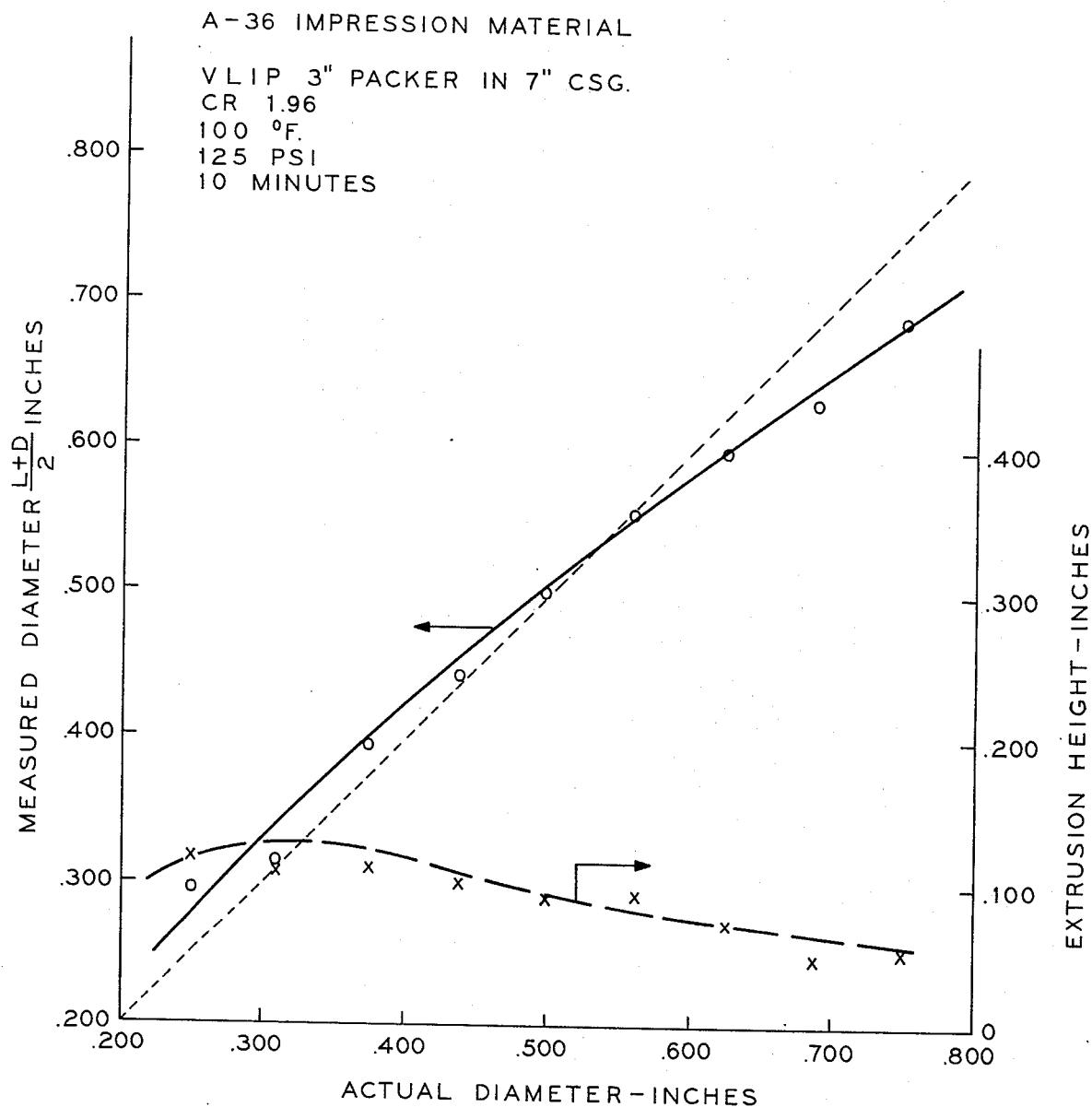
Figure 20:
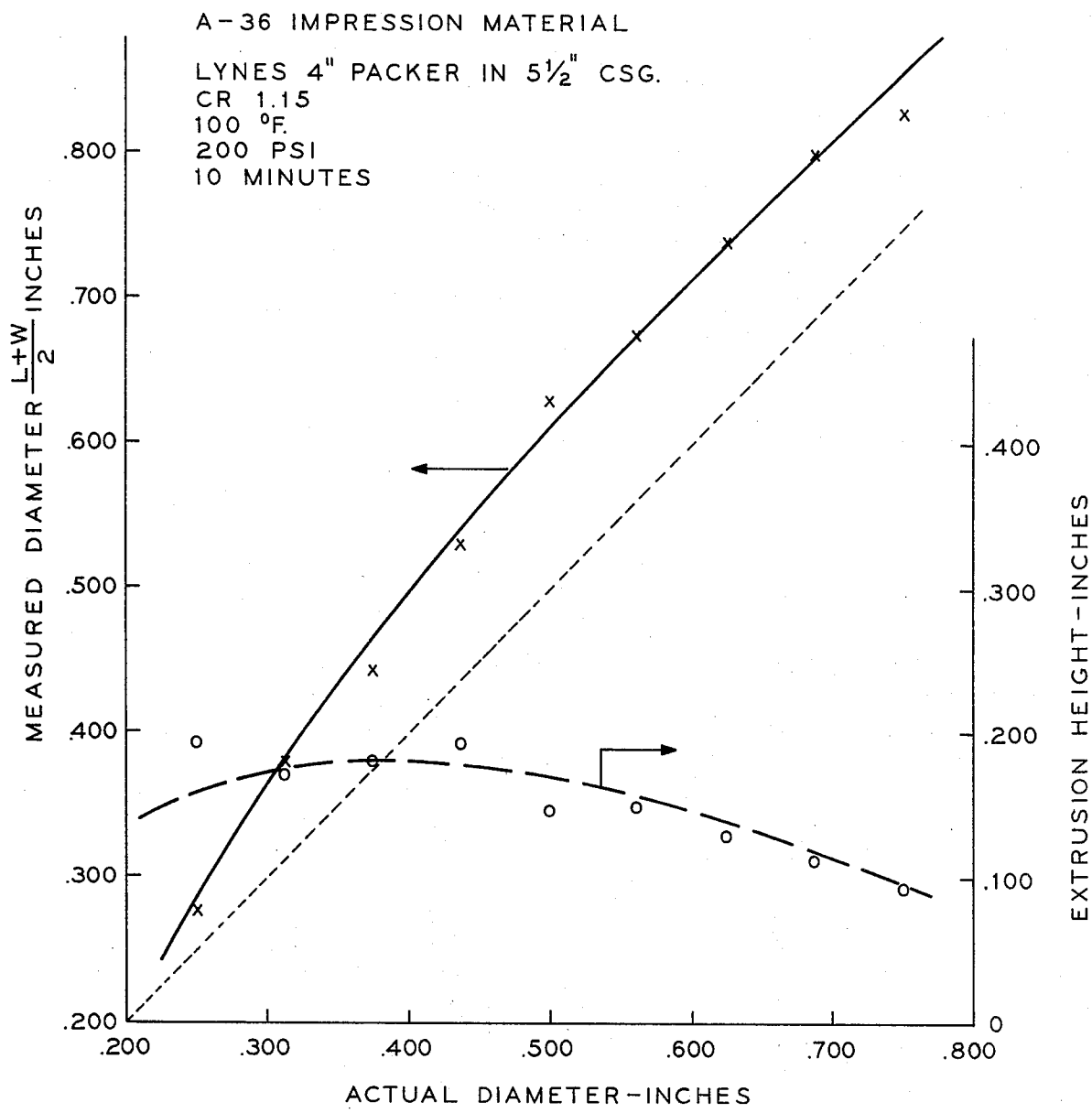
Figure 21:
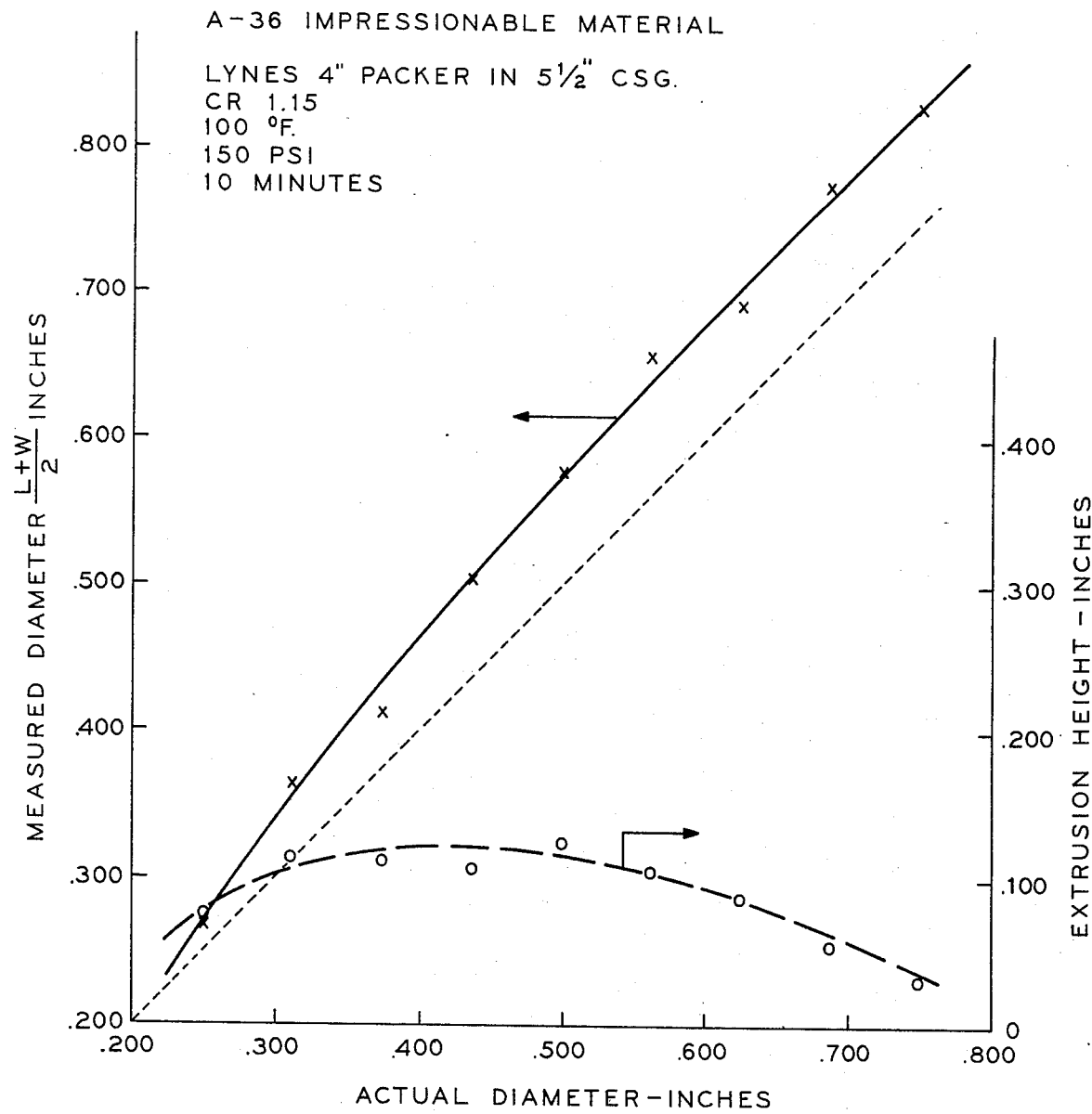
Figure 22:
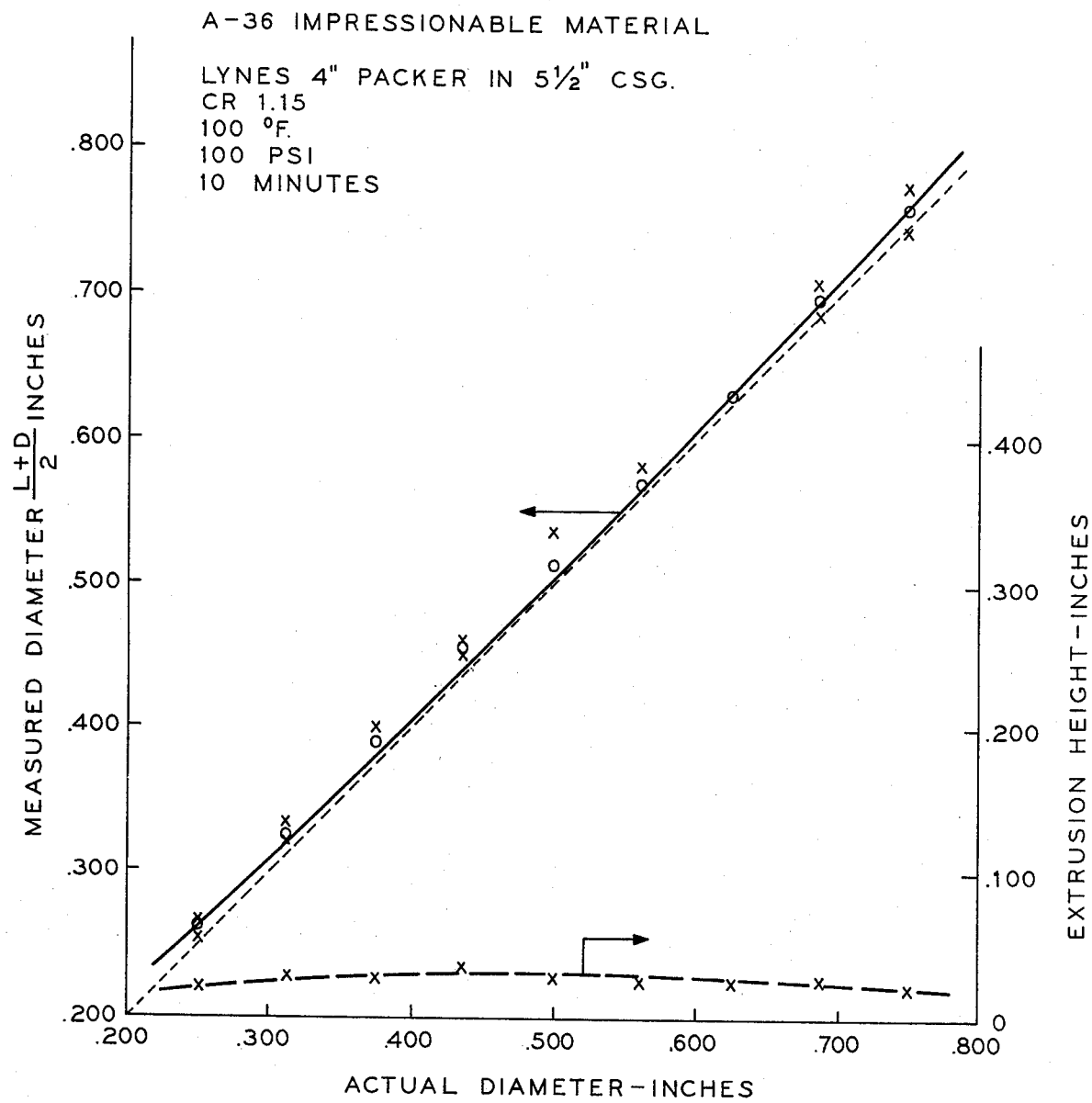
Figure 23:
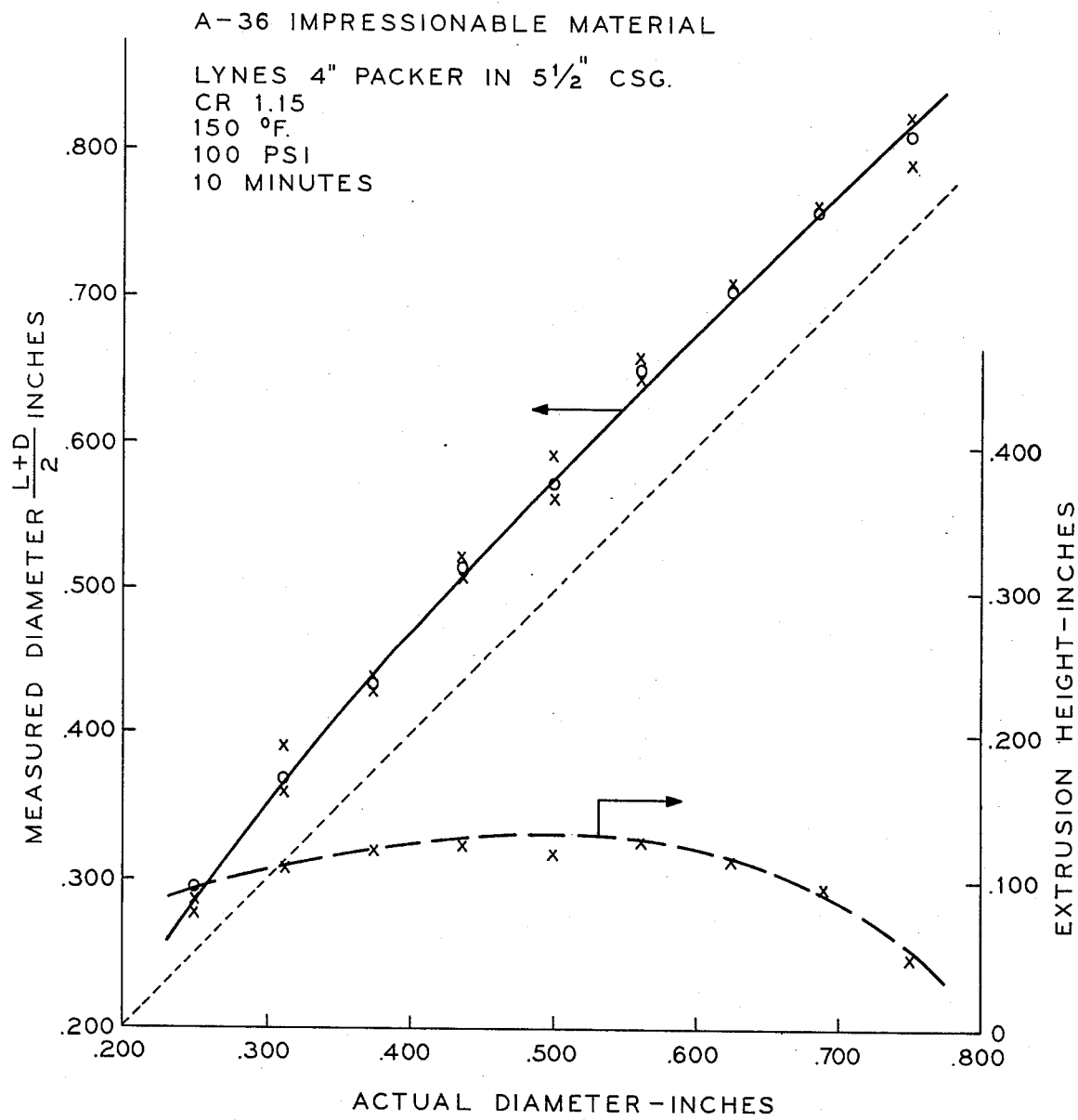
Figure 27:
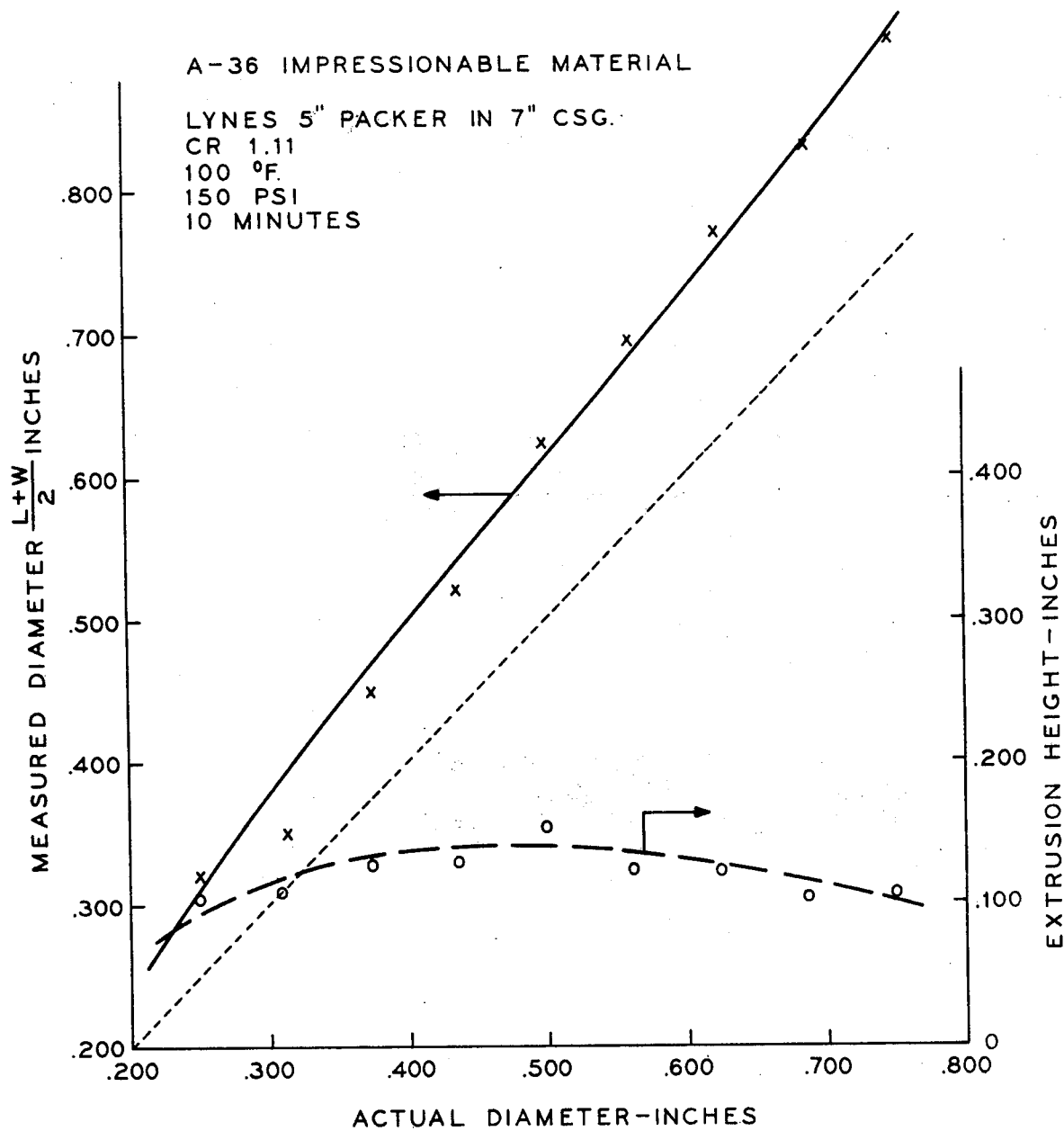
Figure 24:
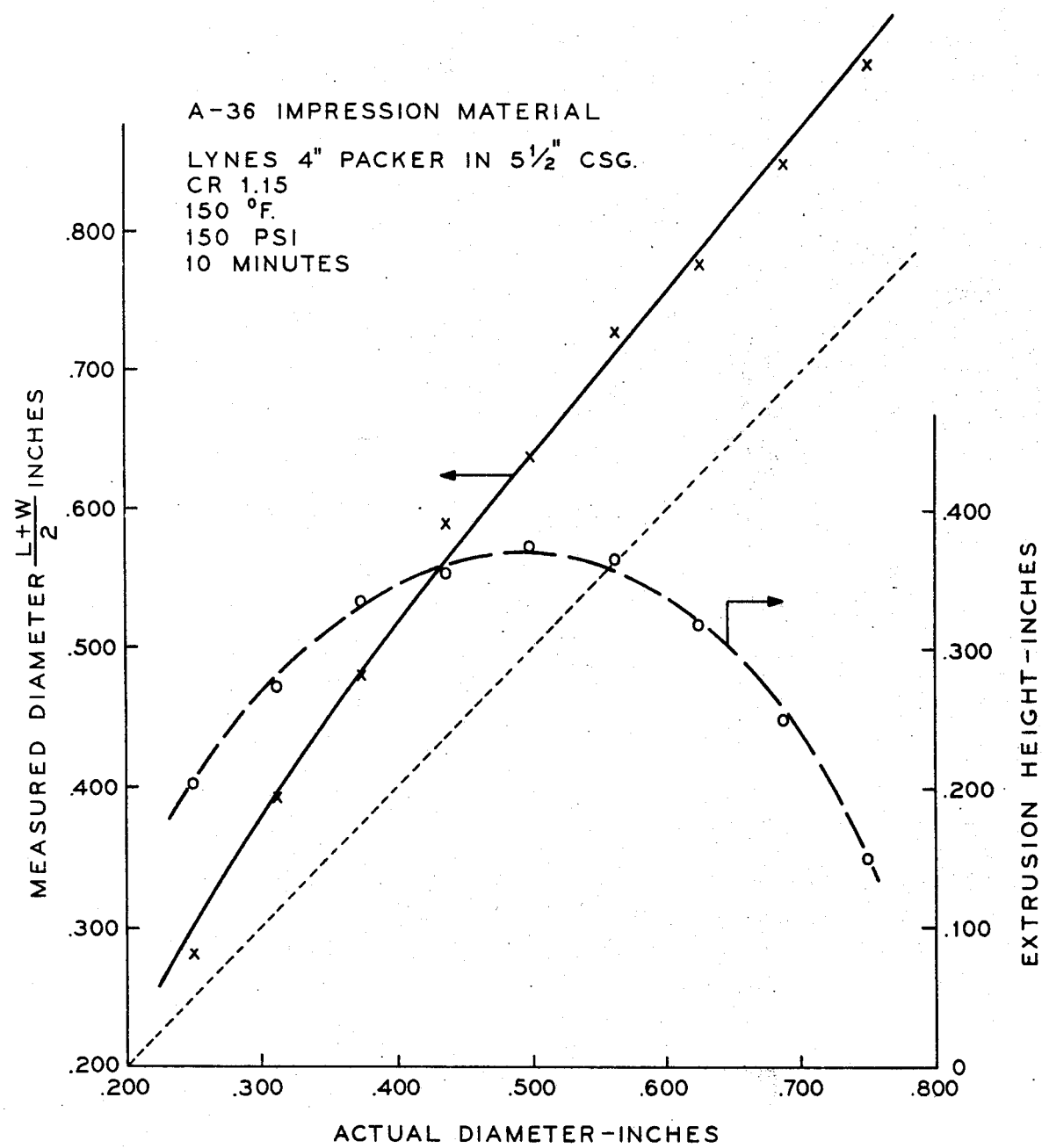
Figure 25:
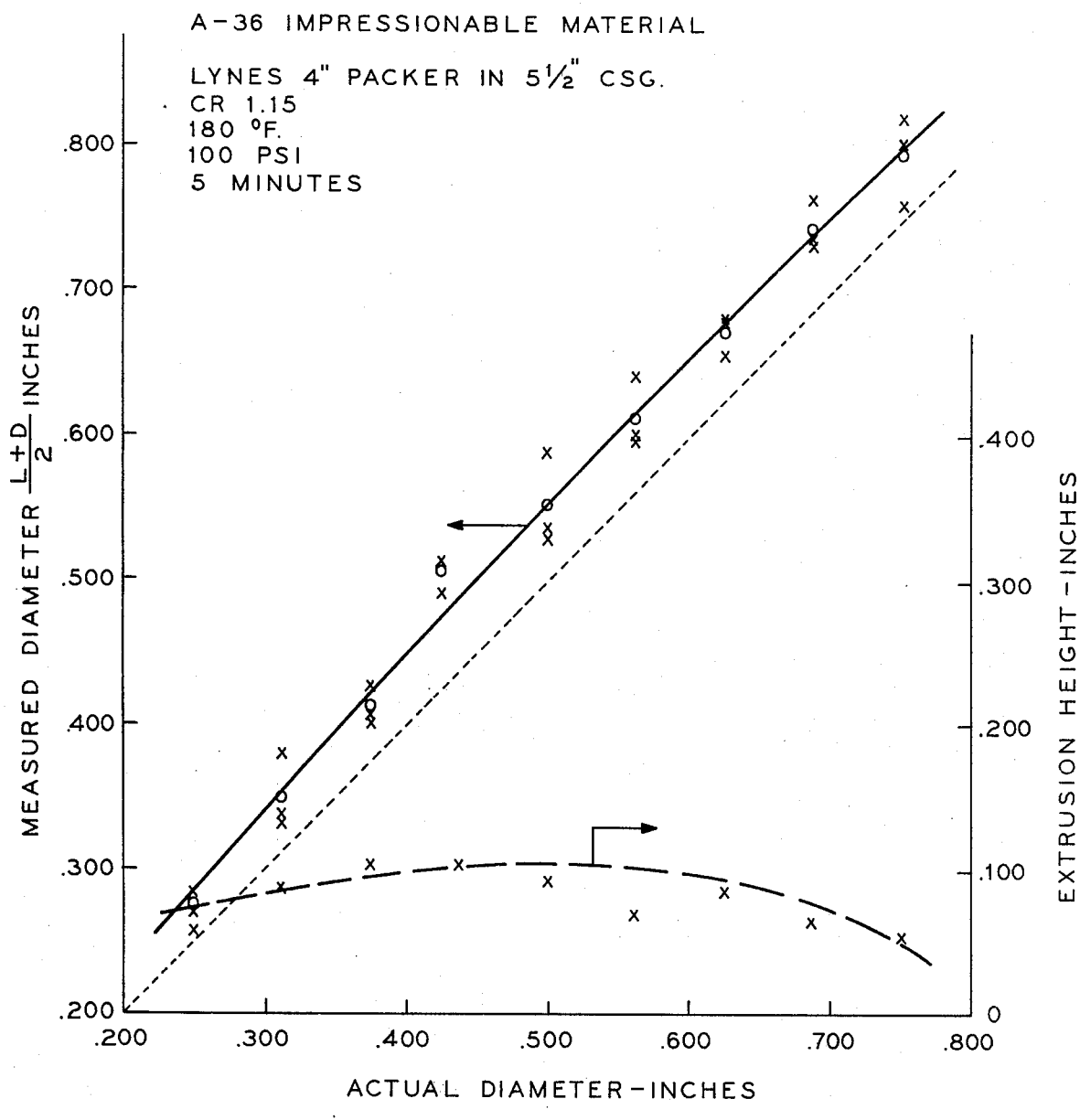
Figure 26:
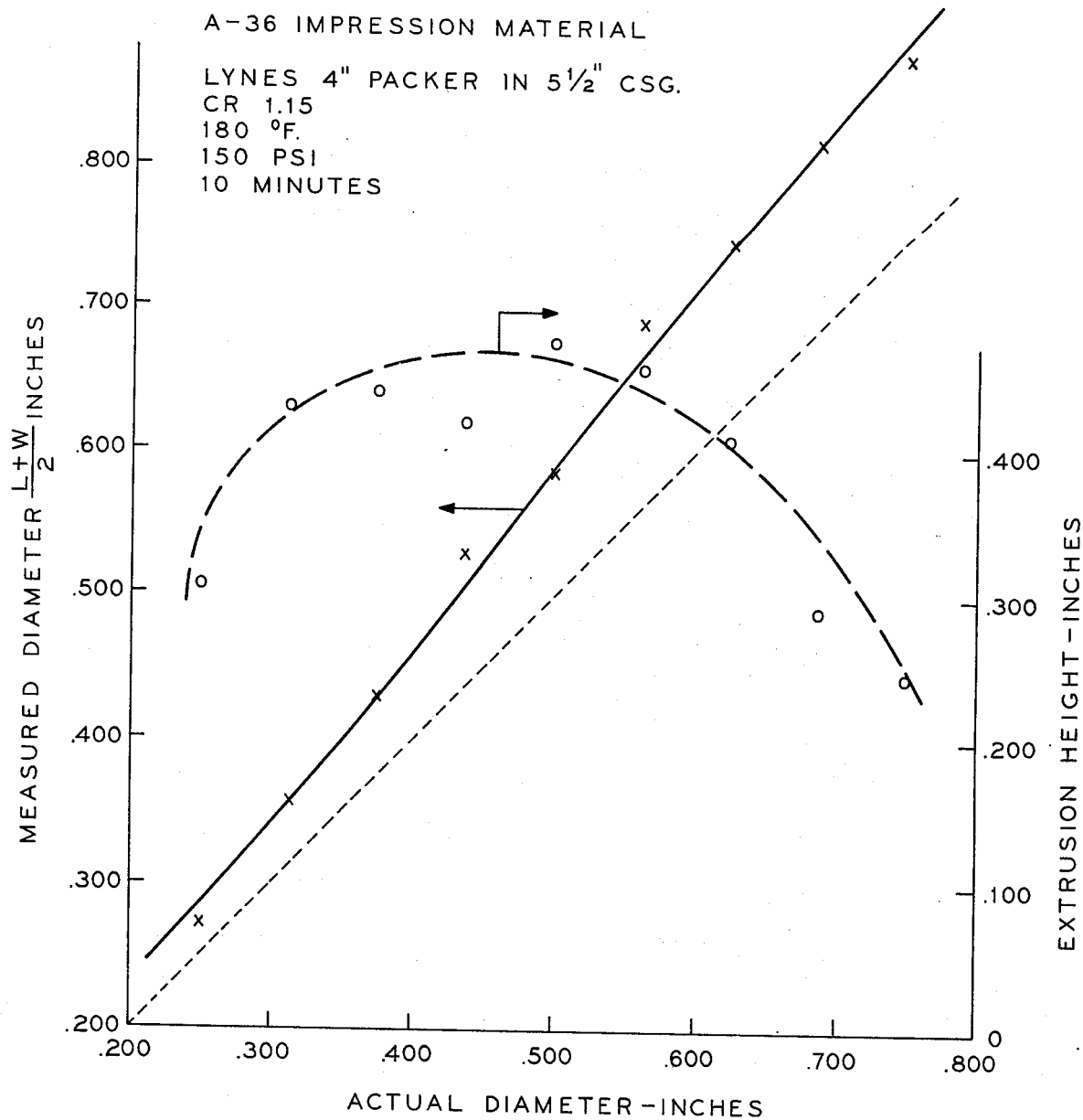
Figure 28:
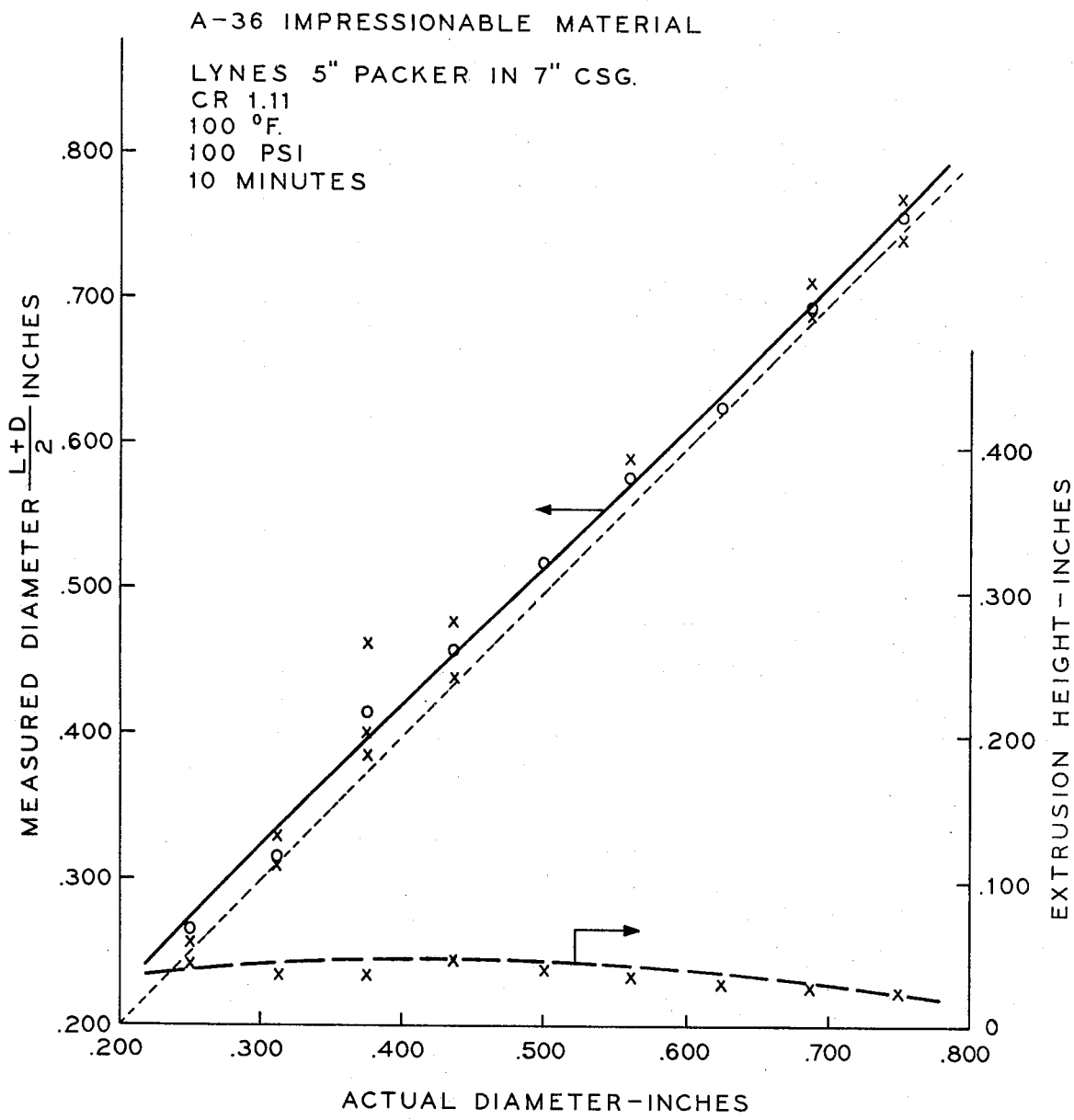
Figure 29:
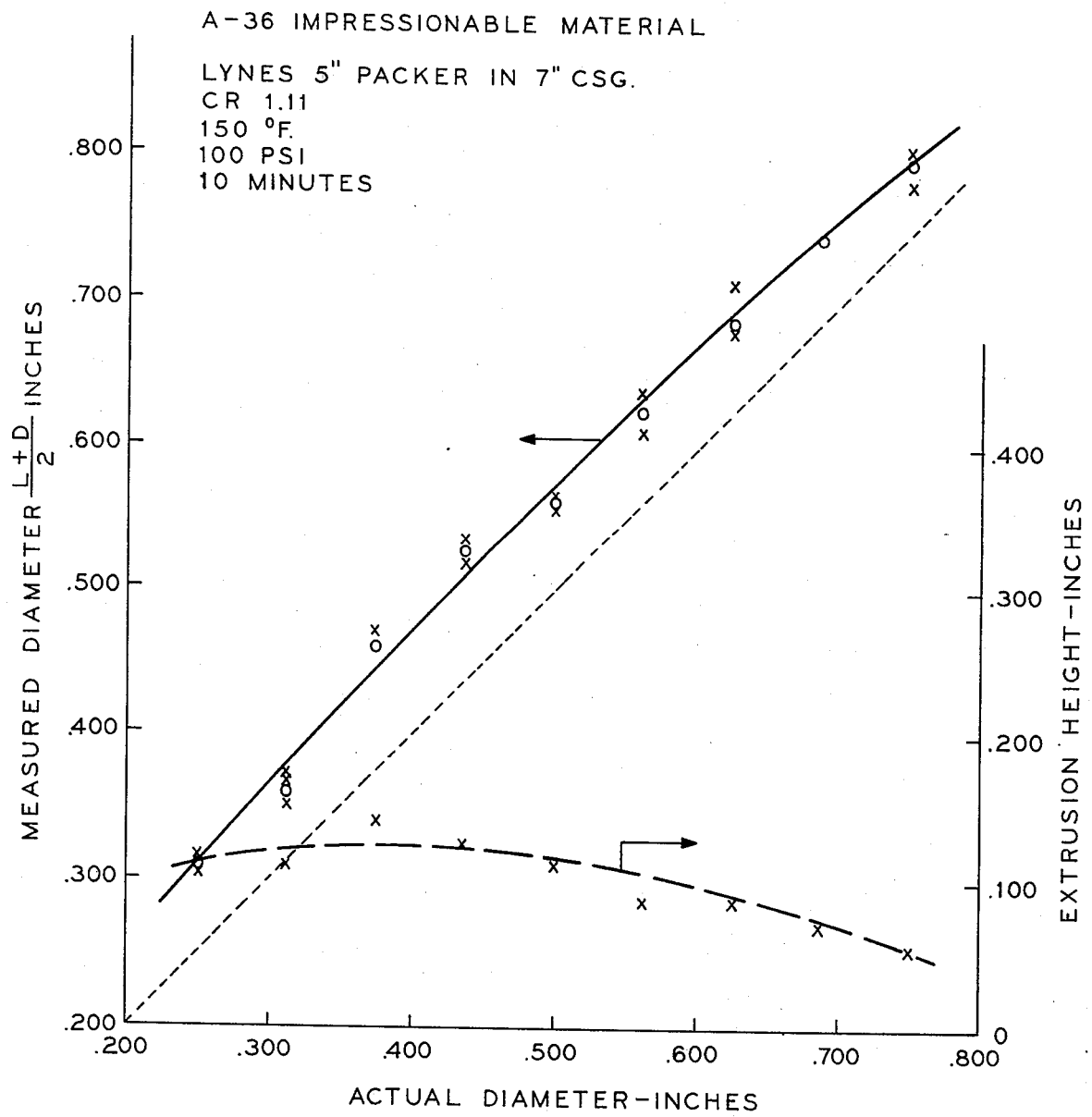
Figure 30:
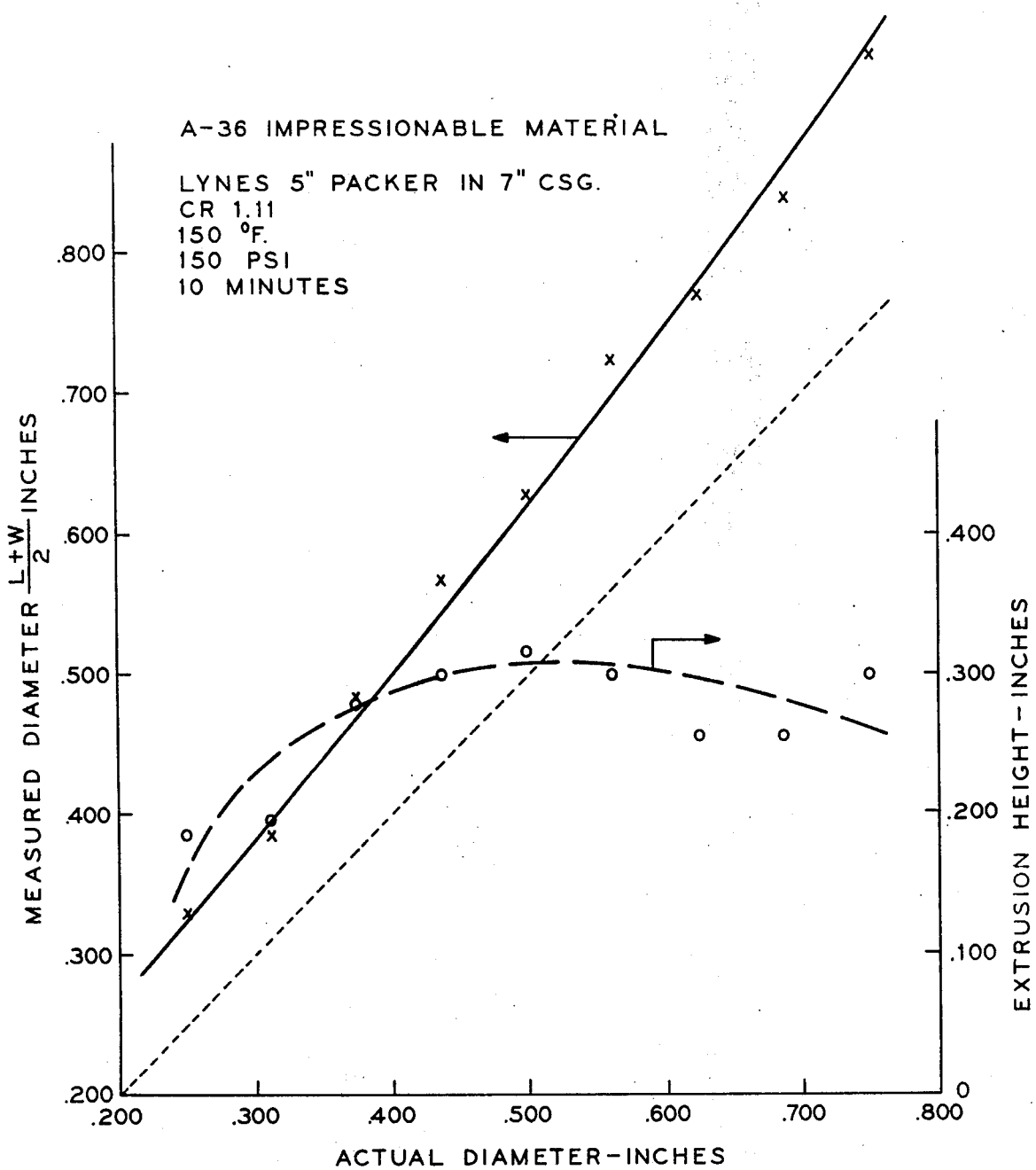
Figure 31:
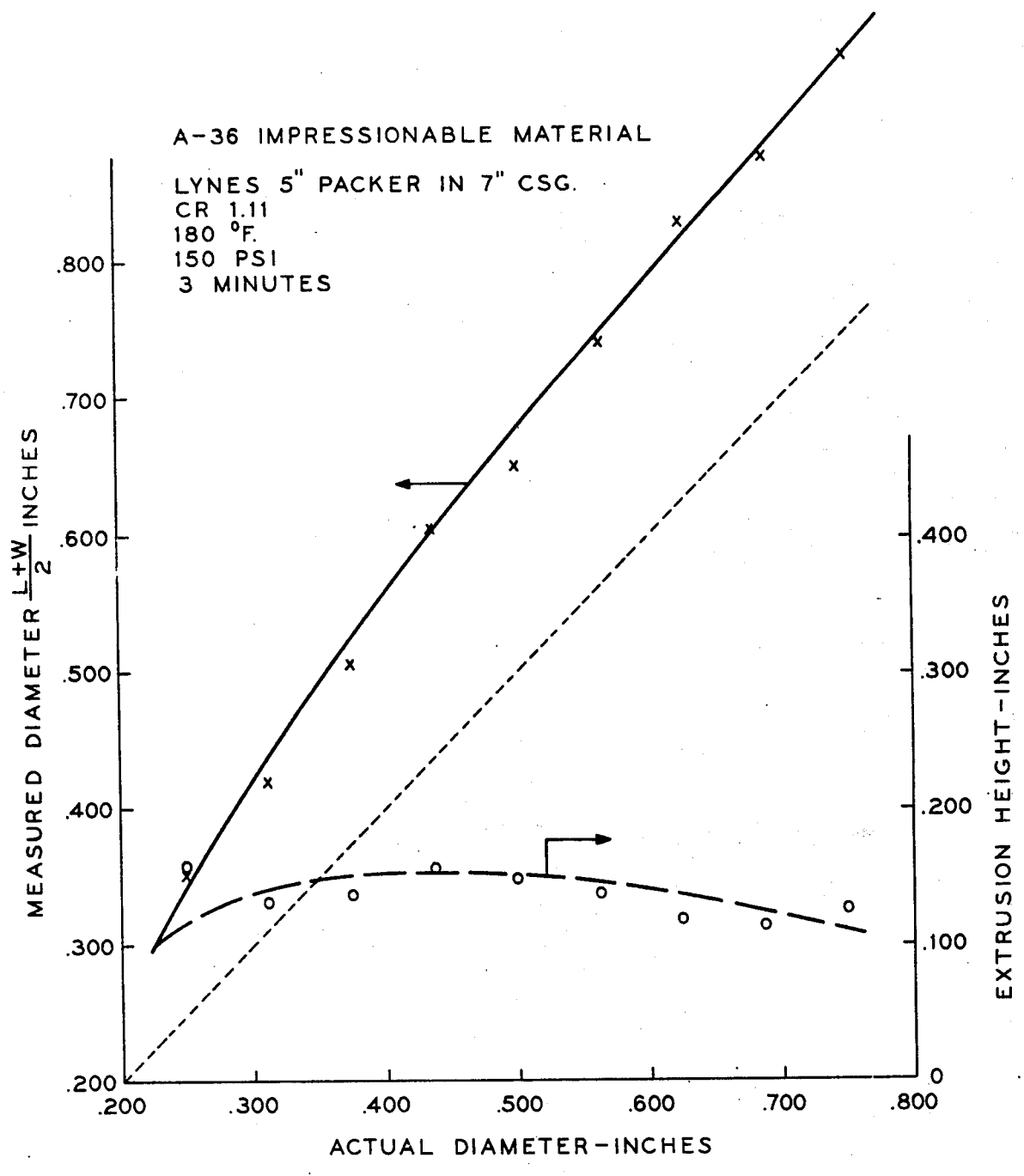
Figure 32:
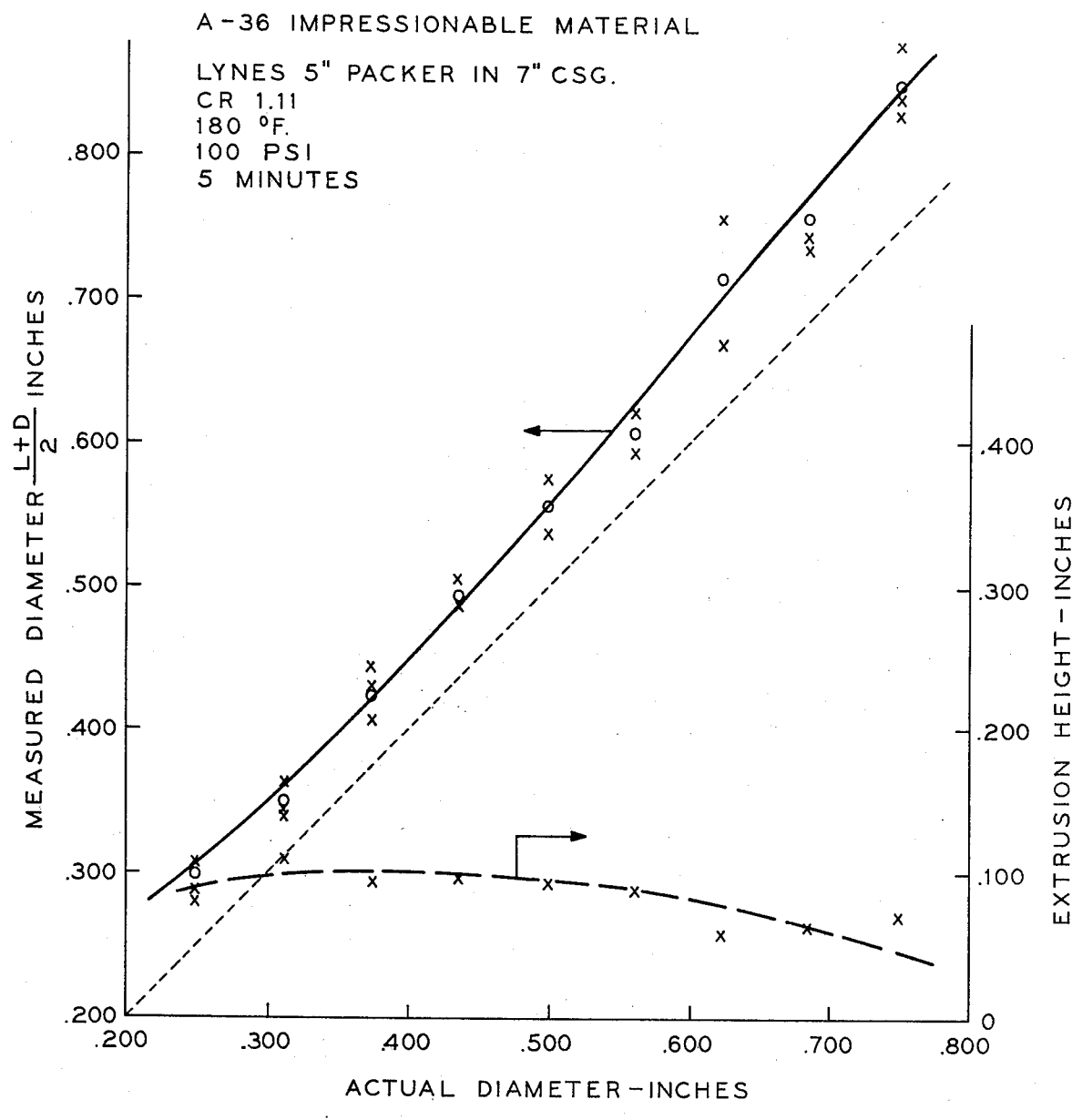
Figure 33:
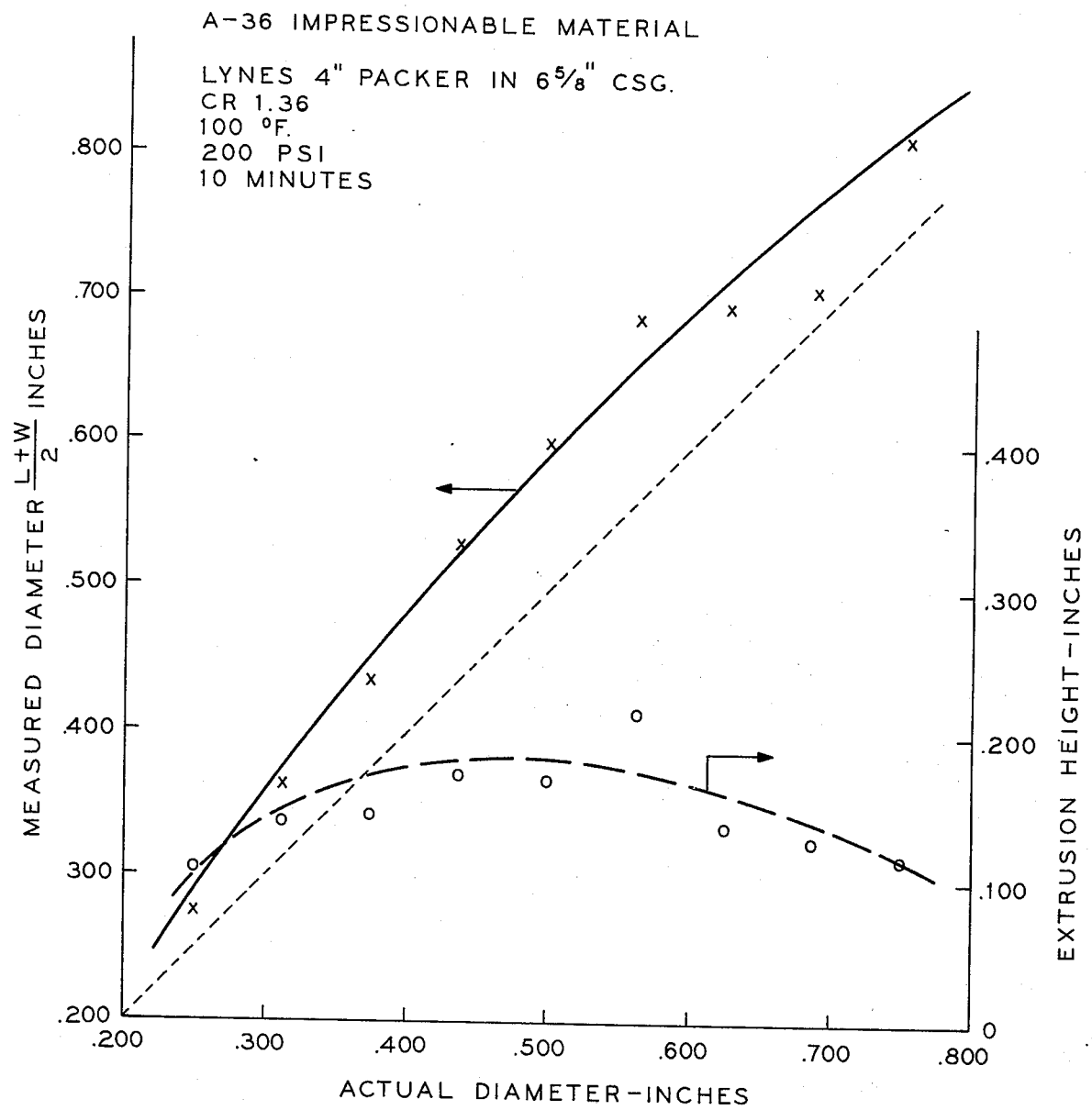
Figure 34:
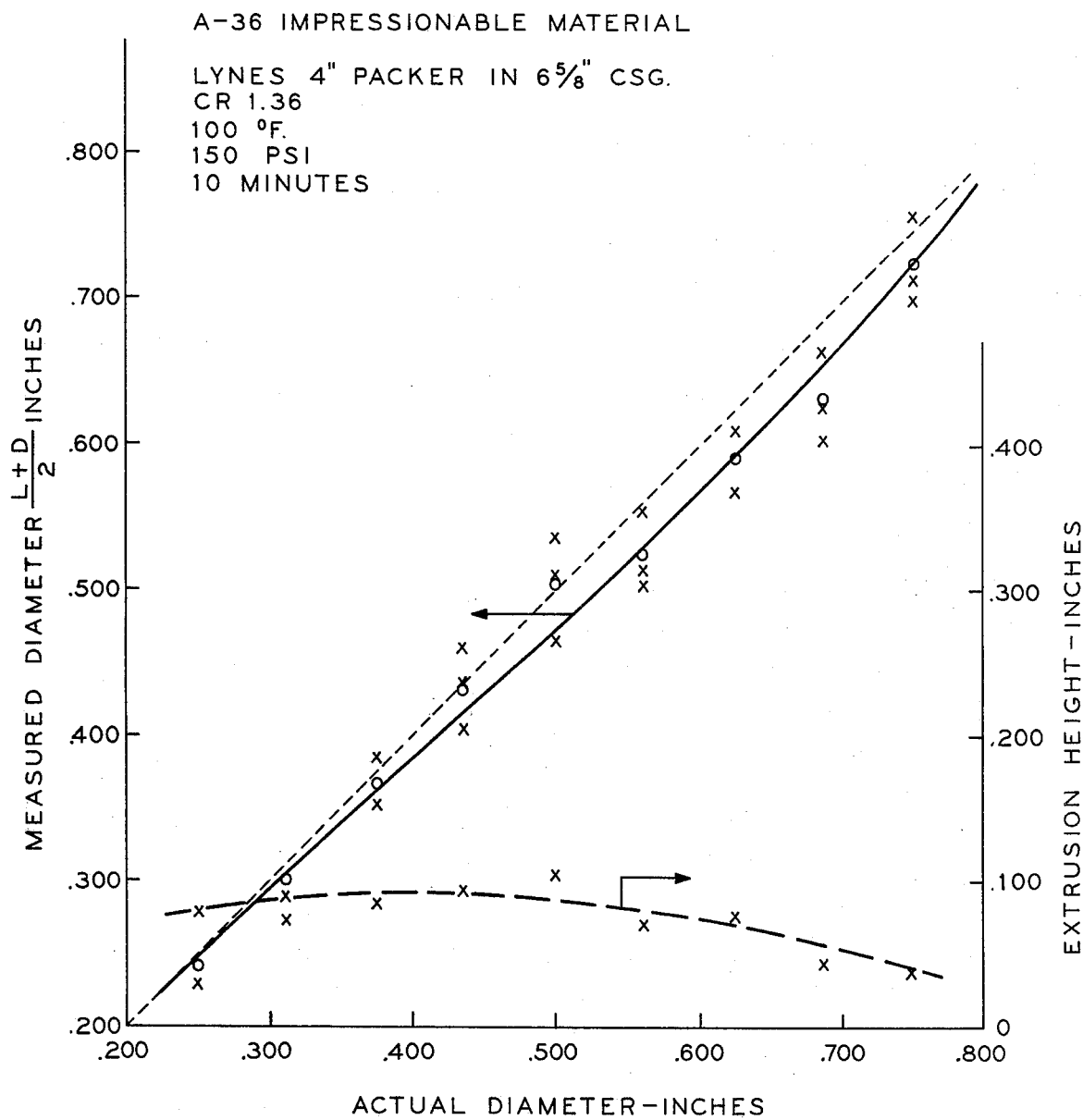
Figure 35:
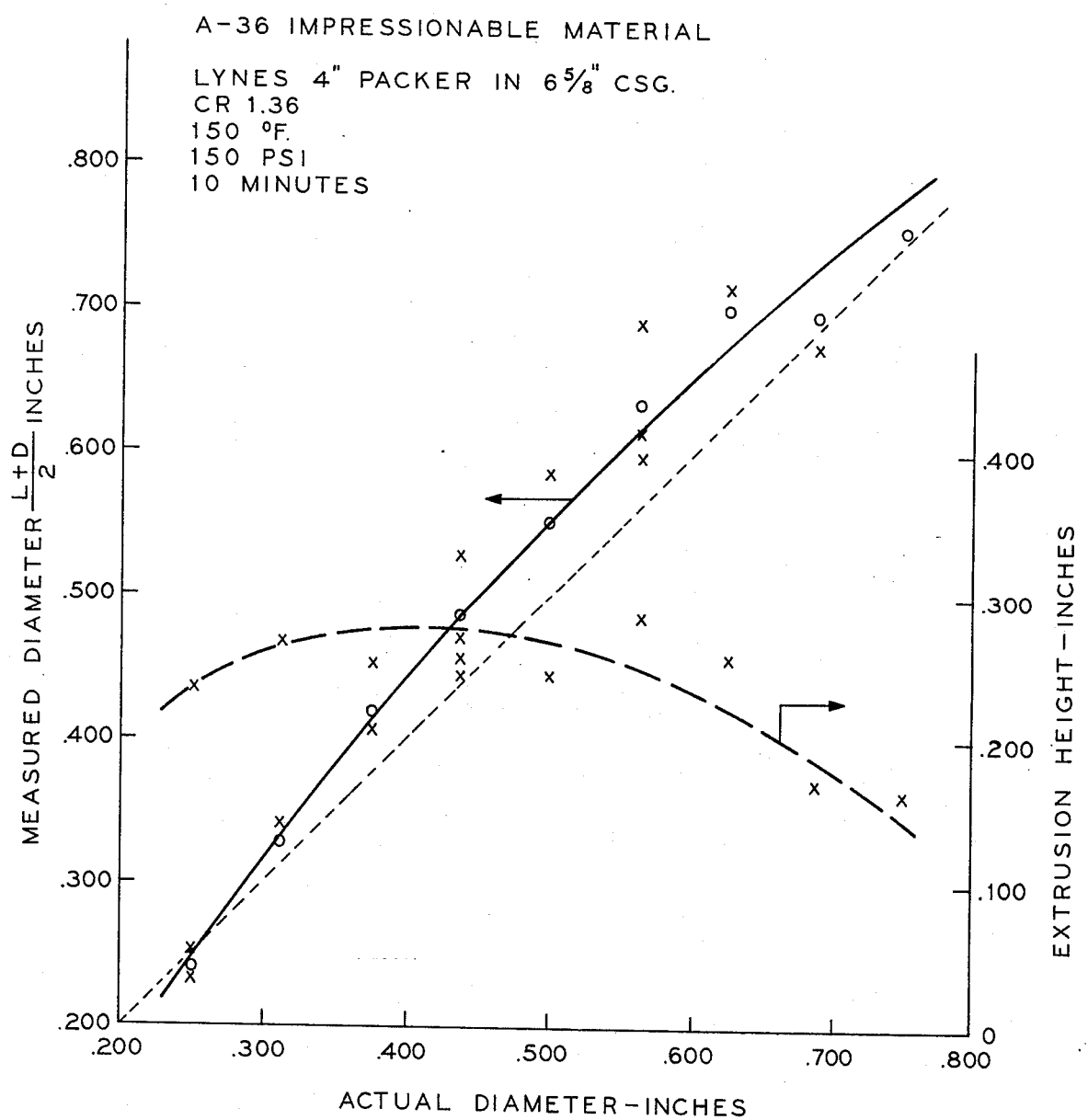
Figure 36:
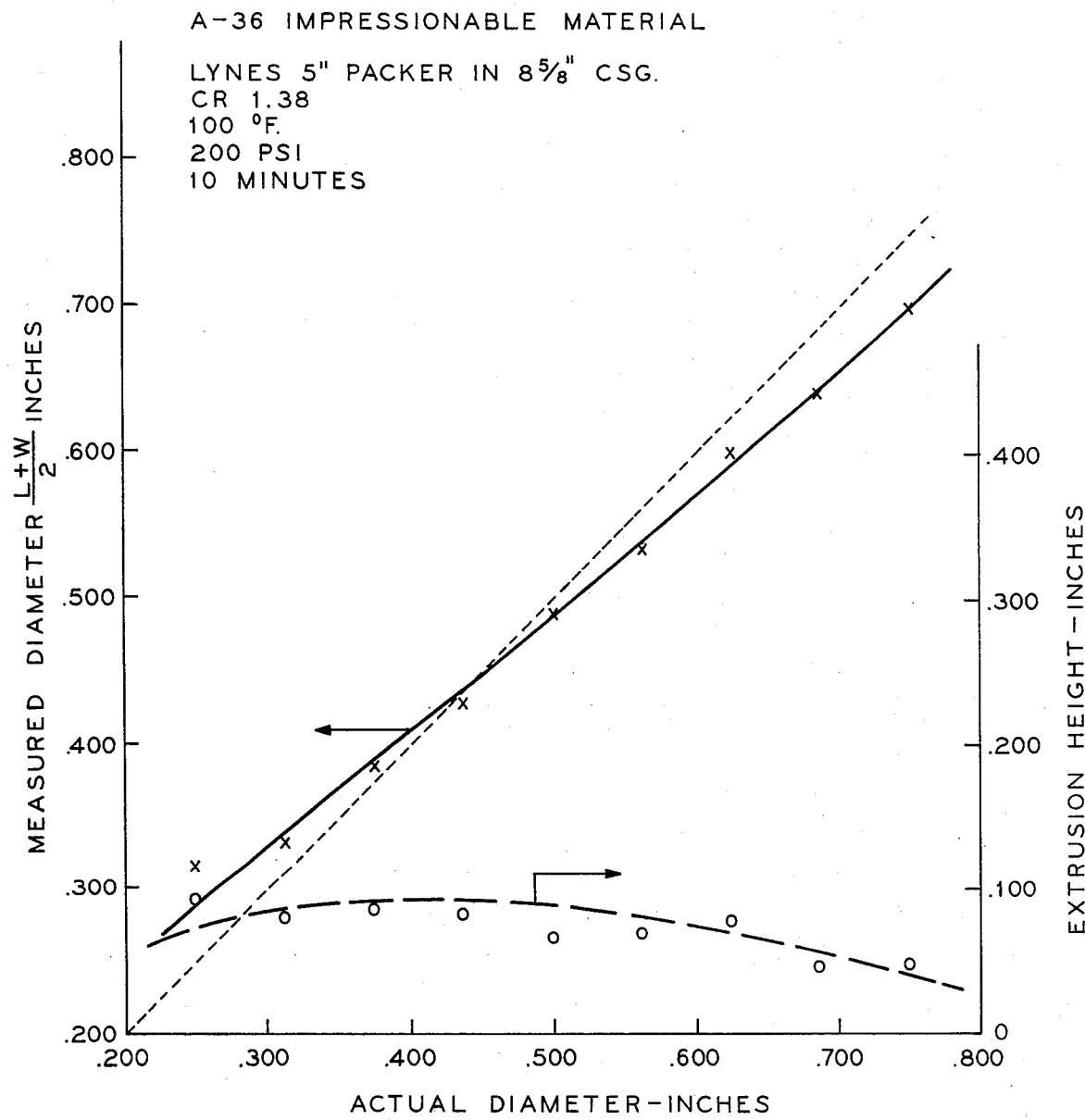
Figure 37:
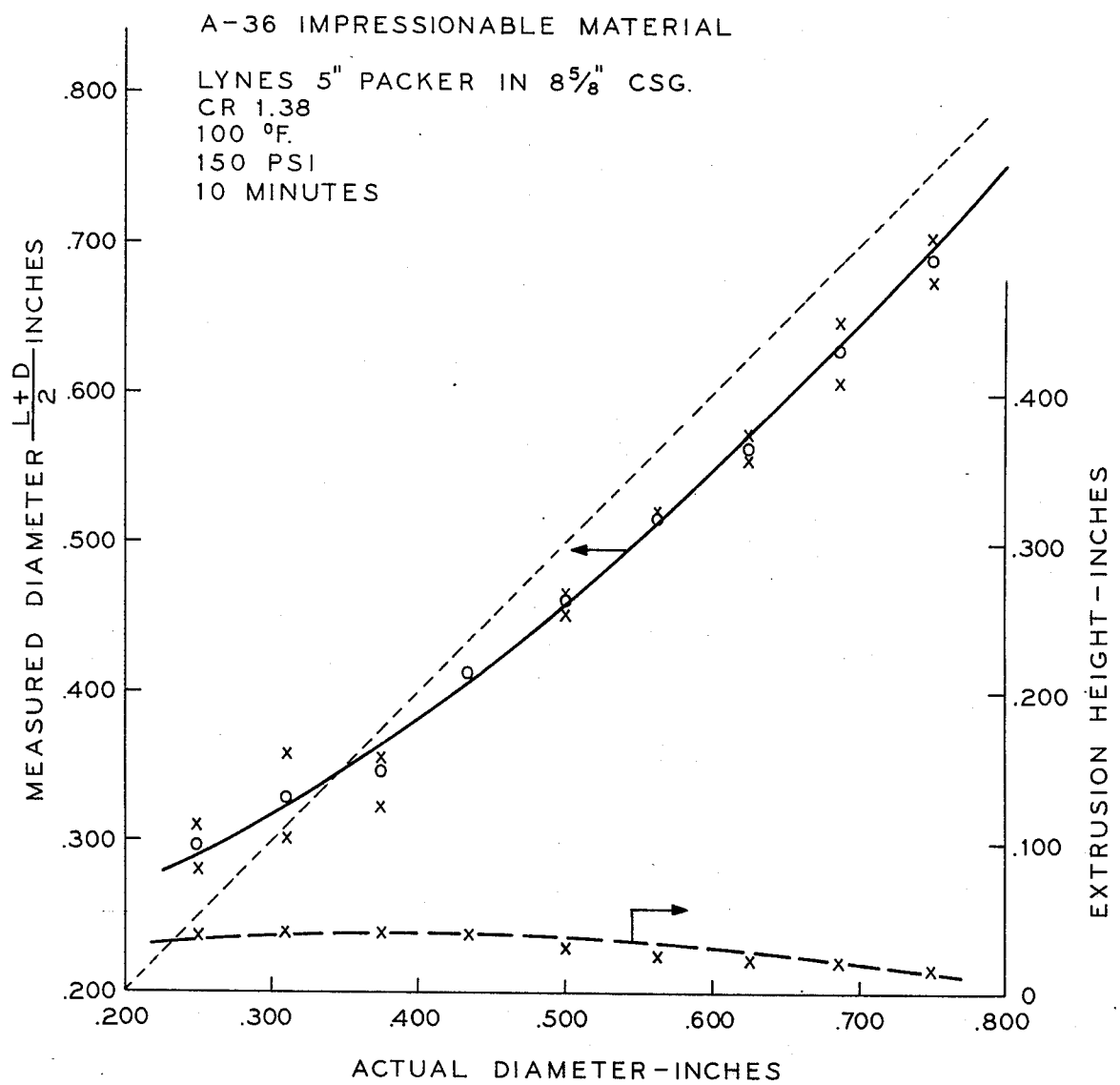
Figure 38:
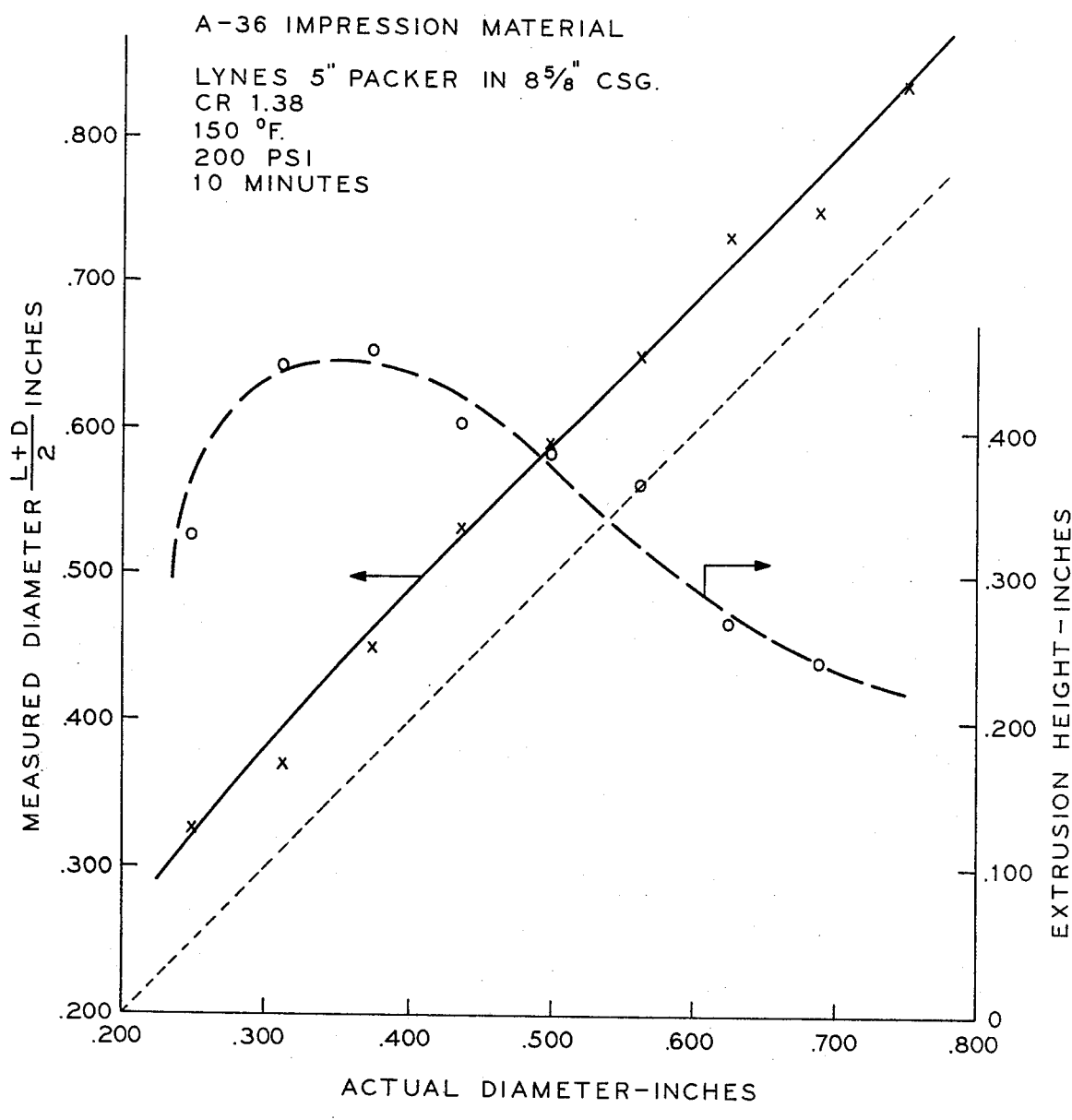
Figure 39:
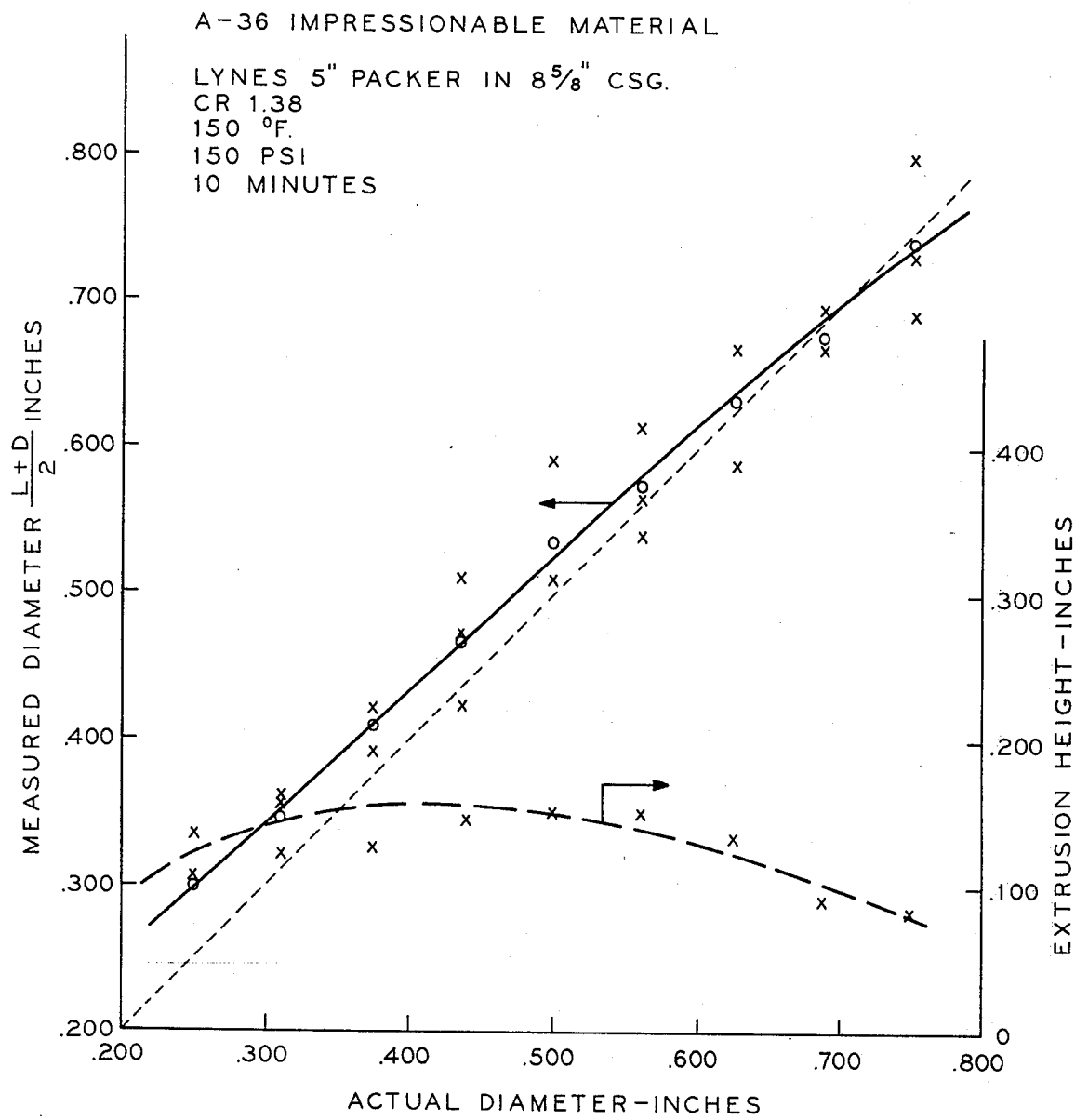
Figure 40:
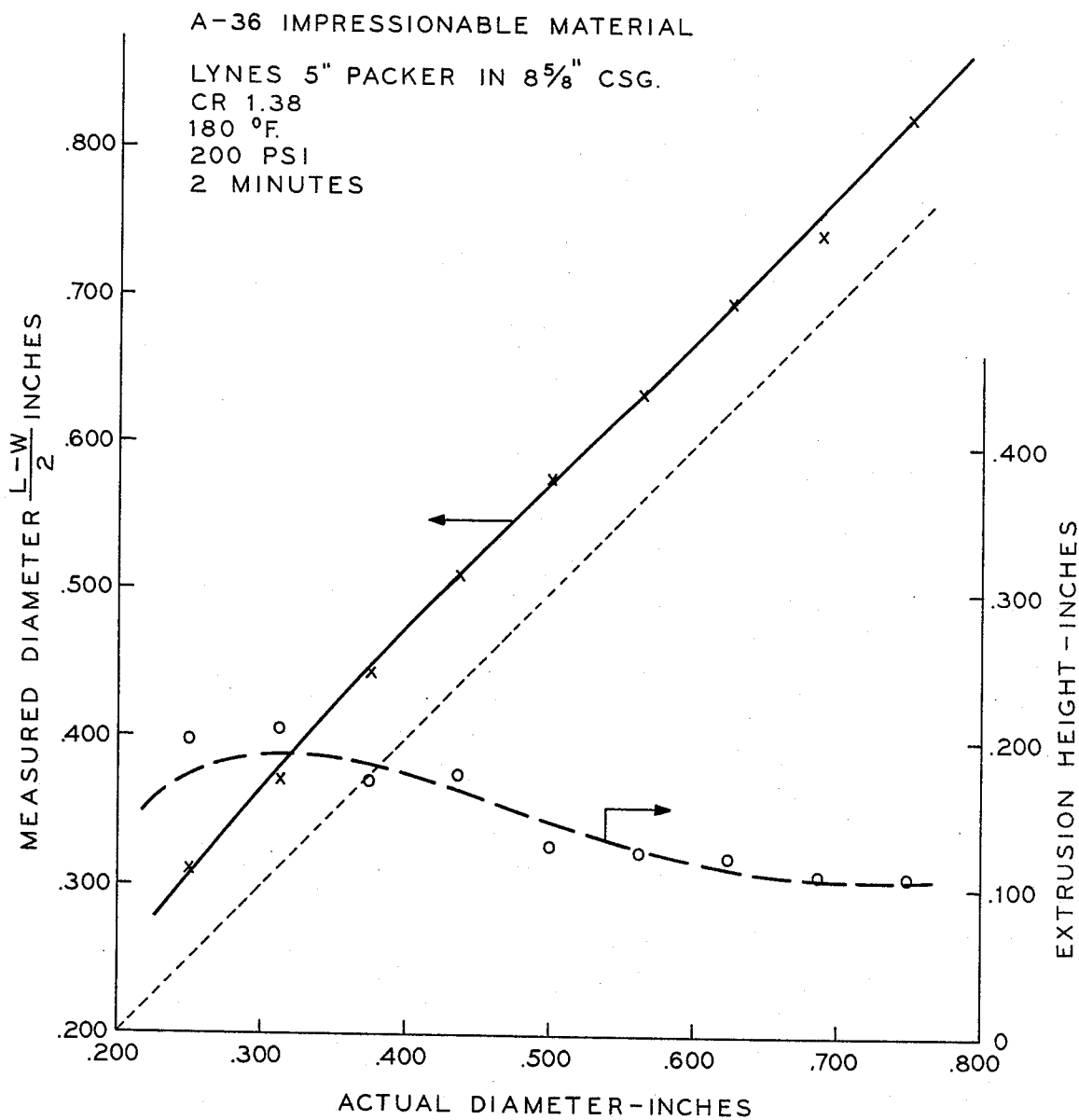
Figure 41:
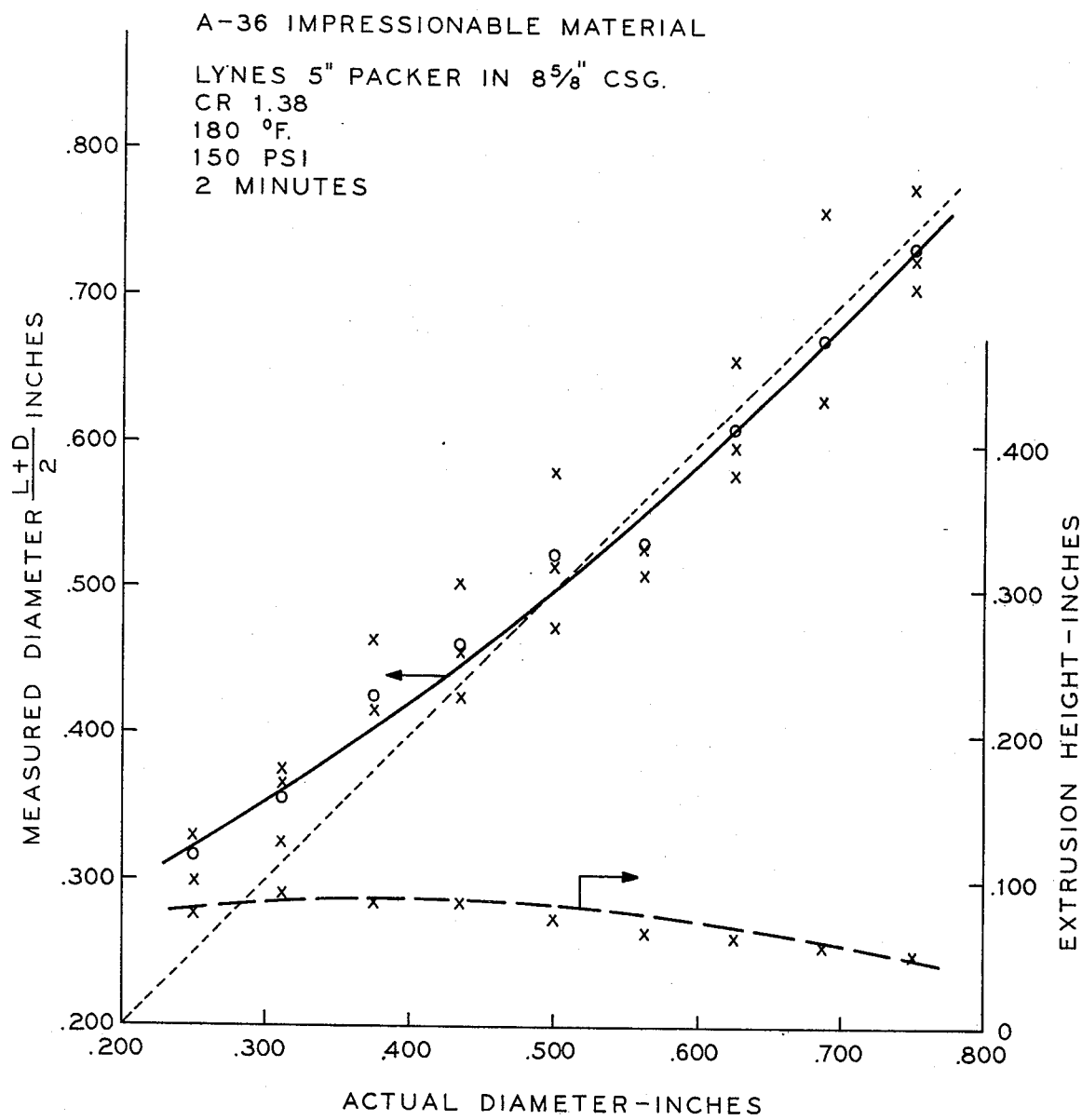
Figure 42:
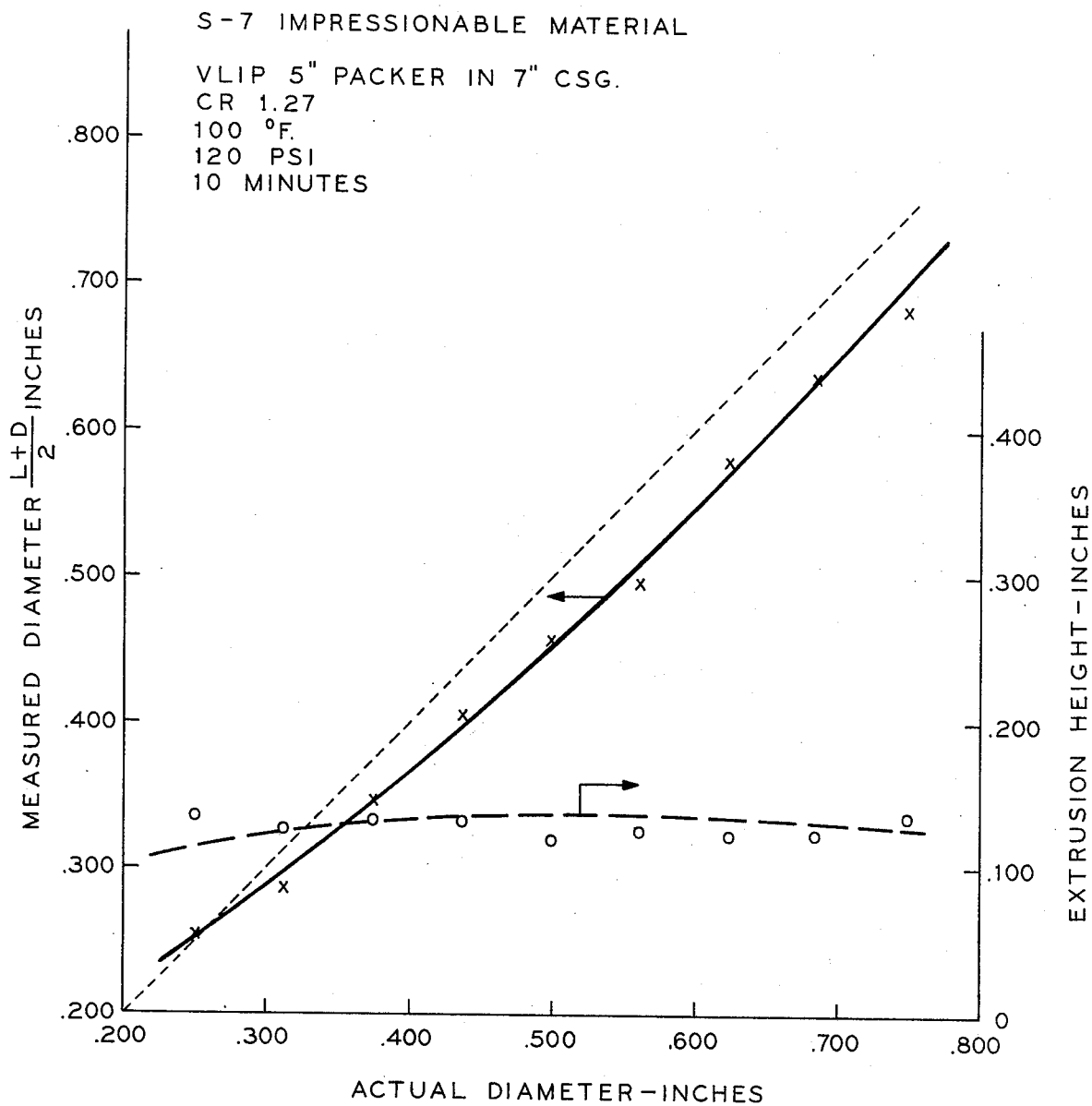
Figure 43:
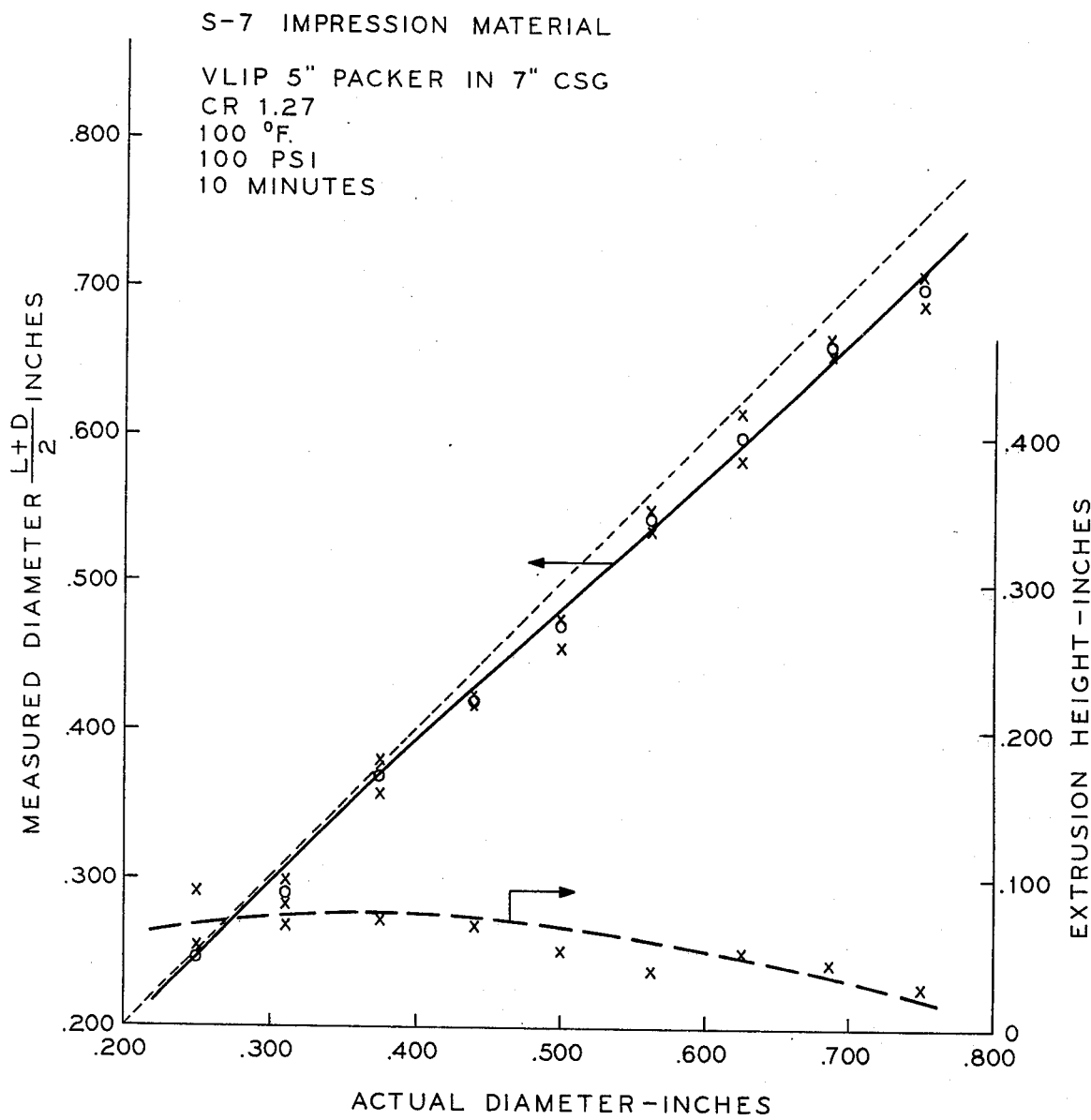
Figure 44:
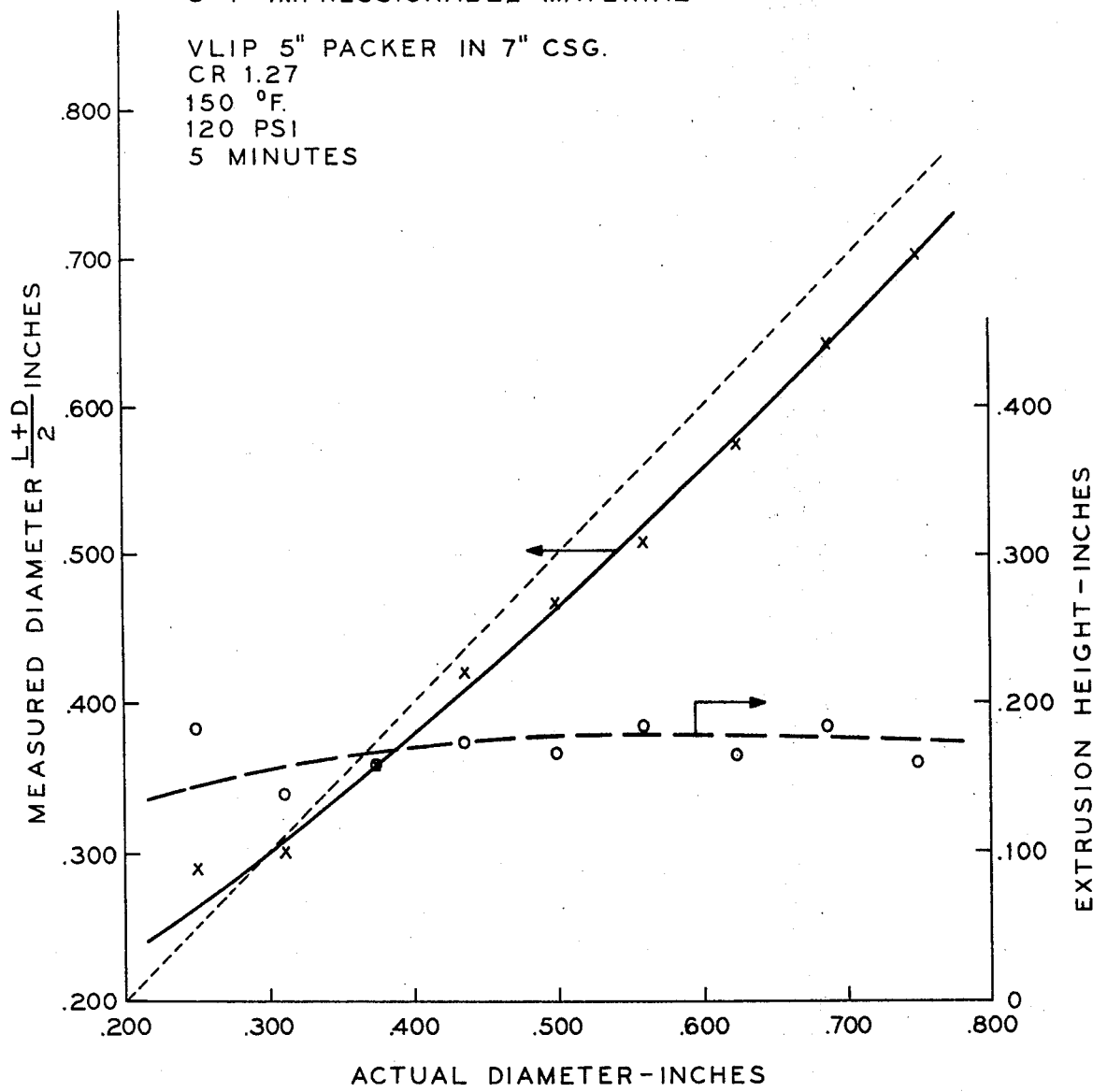
Figure 45:
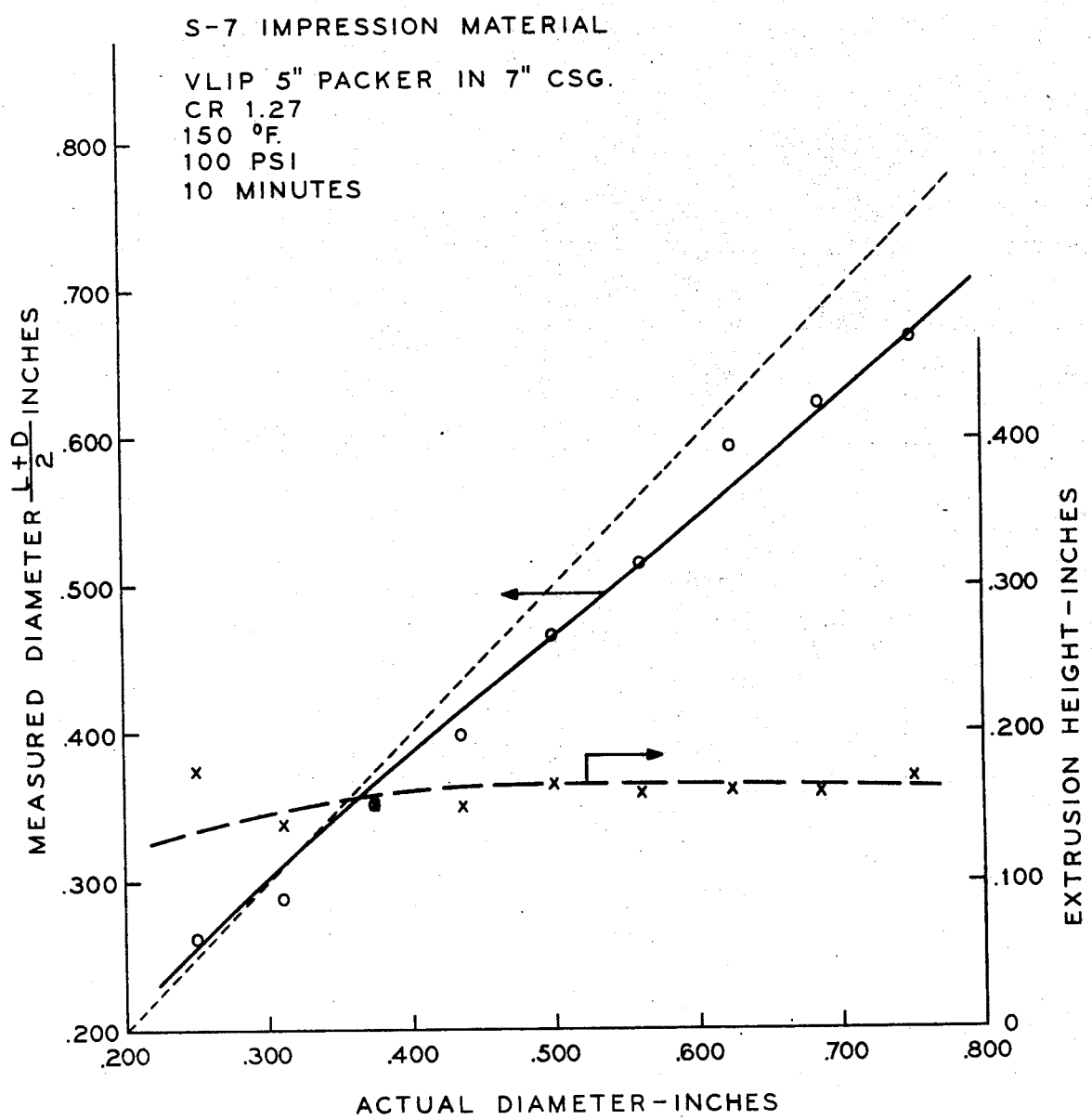
Figure 46:
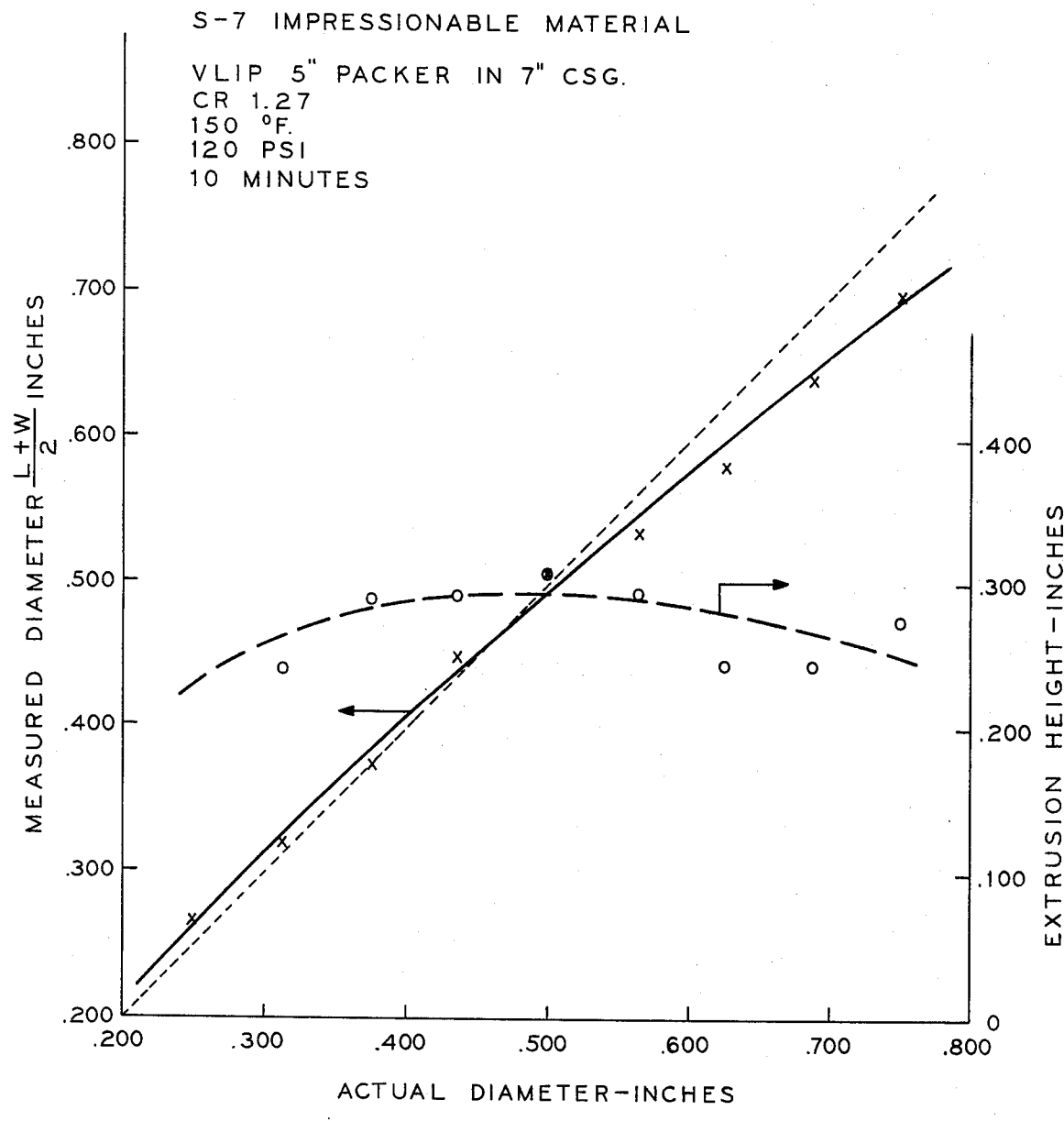

One material especially useful as an impression sleeve of an expandable and retractable packer which sleeve will form and retain an impression of irregularities in a downhole surface and will extrude into a flow opening is formed of a mixture of partially cured synthetic nitrile rubber, natural rubber smoked sheet, hydrated amorphous silica powder and rubber processing oil. The partial cure of the synthetic nitrile rubber is done by heating nitrile rubber containing less than full curing amounts of sulfur, stearic acid and zinc oxide, the curing chemicals. Broadly, a mixture containing from about 60 to 80 percent by weight of partially cured synthetic nitrile rubber including the cure chemicals, from about 10 to 20 percent natural rubber smoked sheet, from about 5 to 15 percent by weight of hydrated amorphous silica powder, and from bout 2 to 6 percent by weight of rubber processing oil has been found satisfactory. A particularly desirable impression sleeve (indicated as "S-7" in FIGS. 8–46) has resulted when the mixture comprises from about 70 to 75 percent by weight of partially cured synthetic nitrile rubber including the cure chemicals, from 14 to 16 percent by weight of natural rubber smoked sheet, about 7.5 to 8.5 percent by weight silica powder, and about 3.5 to 4.5 percent by weight rubber processing oil.

Another material useful as an impression sleeve of an expandable and retractable packer which sleeve will form and retain in impression of irregularities in a downhole surface and will extrude into a flow opening is formed of a mixture of synthetic nitrile rubber, natural rubber smoked sheet, hydrated amorphous silica powder and rubber processing oil. A mixture containing from about 60 to 80 percent by weight of synthetic nitrile rubber; from about 10 to 20 percent natural rubber smoked sheet; from about 5 to 15 percent by weight of hydrated amorphous silica powder; and from about 2 to 6 percent by weight of rubber processing oil has been found satisfactory. A particularly desirable impression sleeve (indicated as "A-36" in FIGS. 8–46) has resulted when the mixture comprises from about 70 to 75 percent by weight of synthetic nitrile rubber; from 14 to 16 percent by weight of natural rubber smoked sheet; about 7 to 8 percent by weight silica powder; and about 3 to 4 percent by weight rubber processing oil.

Still another material useful as an impression sleeve of an expandable and retractable packer which sleeve will form and retain an impression of irregularities in a downhole surface and will extrude into a flow opening is formed of a mixture of natural rubber smoked sheet, hydrated amorphous silica powder and rubber processing oil. A mixture containing from about 50 to 75 percent by weight of natural rubber smoked sheet; from about 10 to 30 percent by weight of hydrated amorphous silica powder; and from about 3 to 15 percent by weight of rubber processing oil has been found satisfactory. A particularly desirable impression sleeve has resulted when the mixture comprises about 57.2 percent by weight of natural rubber smoked sheet; about 28.4 percent silica powder; and about 14.4 percent rubber processing oil.

The extrusion of impression element into a mill-slot, gun perforation or jet perforation must be controlled to permit extrusion well into the performation but not so deep to cause a mushrooming effect so that calibratable impressions can be retrieved. Tests indicate that the ideal extrustion height is between 0.100 and 0.200 inches for accurate calibration data. The length and width of impressions with less than 0.100-inch extrusion height are hard to measure. Impressions extruded beyond 0.300 inch tend to become distorted, which results in inaccuracies.

The accurate measurement of the actual size and shape of jet and gun perforations in a tubular member positioned in a well is a very important function. Impression packer calibration runs indicated that an accurate correlation can be made between extrusion size and actual hole size. The extrusion impression of a round hole will appear as an oval on the deflated packer due to the difference in longitudinal and circumferential stretch. Tests indicate that an average of the length and width of the oval impression $(L+W/2)$ gives an average diameter which closely approximates the actual size of the hole diameter under ambient conditions. To confirm the accuracy of the impression size to actual size correlation, a great number of tests were run under simulated well conditions. Full-sized inflatable packers covered with various impressionable materials were tested in various size casings containing three sets of drilled perforations ranging in diameter from ¼ to ¾ inch by sixteenths. These casing samples and full-sized impression packers were suspended and submerged in a test well full of water, the temperature of which could be controlled at any level between ambient temperature (±80°F) and 200°F. Numerous runs were made with each size packer in each casing size at three temperatures (100°F, 150°F and 180°F) and three differential inflation pressures (100 psi, 125 psi, and 150 psi for "VLIP" (variable length inflatable packer) packers; and 100 psi, 150 psi and 200 psi for Lynes Packers). The VLIP packers are described in copending applications Ser. No. 367,602, filed June 6, 1973, Ser. No. 423,593, filed Dec. 10, 1973, and Ser. No. 430,326, filed Jan. 2, 1974. The Lynes packer is a commercially available packer made by the Lynes Company.

The procedure used in these calibration tests consisted of:

1. Installing the desired perforated casing sample in the test well;
2. Establishing the desired temperature level in the test well;
3. Running the inflatable impression packer into the casing sample and allowing the packer to come up to temperature;

4. Inflating the impression packer to the test differential inflation pressure for the prescribed length of time;
5. Deflation and pulling the packer out of the hole;
6. Calibration of extrusion size vs. actual hole size by measuring height, length and width of each extrusion and comparing these measurements with the actual known hole sizes in the casing sample.

A study of these calibration tests indicates that the accuracy of the correlations of impression size and shape to actual hole size is most critical to the following parameters:
1. The temperatue of the impressionable material during extrusion;
2. The circumferential ratio of the deflated packer to the inflated packer;
3. The differential inflation pressure applied to the packer;
4. The duration of the inflation period.

The circumferential ratio is controlled by the well configuration and the availability of a limited number of packer sizes. The downhole well bore temperature is controlled by the geothermal gradient of the particular area. Therefore, the two controllable parameters for accurate correlation of extrusion size to actual hole size are the differential inflation pressure and the duration of inflation. The ideal extrusion height for calibration work is from 0.100 to 0.200 inches, and to stay within this desirable bracket the four parameters above must be known and accurately controlled. Generally to maintain the ideal extrusion height as temperature increases, the differential inflation pressure and/or the duration of inflation must be reduced. Under constant temperature conditions, increasing the differential inflation pressure by 50 psi will about double the extrusion height. Cutting the inflation time in half will reduce the extrusion height by approximately half. As the circumferential ratio increases, the differential inflation pressure must also be increased to maintain an ideal extrusion height under constant temperature conditions.

Since it is impractical to develop a single calibration curve with four variable parameters, the calibration curves shown in FIGS. 8-46 for correlating impression size to actual hole size were developed for specific conditions. Thus, by knowing the downhole temperature and the circumferential ratio before running the impression packer into the well, an appropriate differential inflation pressure and duration of inflation can be selected to meet the specific conditions of a calibration curve and permit an accurate correlation of extrusion size to actual hole size.

Thus, in accordance with the invention, a determination of actual flow opening size of holes in an underground tubular member is made by comparing extrusions taken in a well with calibrated extrusion data developed on the surface. The data include extrusion diameter vs. actual hole size obtained in test apparatus under conditions similar to those encountered in the well of interest. An equivalent inflatable impression packer is run in the test apparatus under simulated well conditions and well geometry. A series of holes of different known sizes are placed in the surface apparatus and an impression run of the same time and pressure as will be used downhole is done. The size of the extrusion of the impression material for each hole is correlated with actual hole size. A plot of extrusion size vs. actual size may be made. A similar inflatable impression packer is then run in the well and operated at the same conditions as was the inflatable impression packer used in the surface apparatus. By comparing the extrusions obtained from the well with the calibrated data obtained from the surface apparatus runs, information regarding the actual sise of the flow openings of the downhole tubular member is obtained.

It will be readily appreciated from the foregoing disclosure and demonstrations that variations can be made by those skilled in the art without departing from the scope and spirit of the appended claims.

What is claimed is:

1. A method of obtaining the actual size of a flow opening in a tubular member located in a well penetrating an underground formation, comprising the steps of inserting into a well adjacent an opening in a tubular member positioned adjacent an underground formation an impression-forming material, said impression-forming material being capable of being at least partially extruded into said opening, contacting said tubular member adjacent said opening with said material for a period of time and at a pressure sufficient to extrude at least a portion of said material into said opening, removing said material containing said extrusion from contact with said tubular member, removing said material containing said extrusion from said well, measuring the size of said extrusion, and comparing said extrusion with calibrated data of extrusion size vs. actual hole size obtained under simulated well conditions and geometry with an equivalent impression material to determine the actual size of said opening in said tubular member.

2. A method of determining actual size of a flow opening in a well tubular member from an extrusion of impression material obtained by forcing the impression material into said flow opening comprising measuring the inner diameter of a well tubular member having a flow opening therein, measuring the temperature in said well tubular member adjacent said flow opening, establishing a surface test tubular member having a plurality of test flow openings of different sizes formed therein, adjusting the temperature of said test tubular member to a value substantially equal to said well tubular member, inflating a test inflatable impression packer having known operating characteristics and dimensions at a known pressure for a known time in said test tubular member to extrude impression material into said plurality of test flow openings to obtain a plurality of test extrusions of impression material on said test inflatable impression packer, deflating said test inflatable impression packer, measuring the size of said test extrusions when said packer is deflated, correlating the measured size of said test extrusions to the actual size of said test flow openings, running a working inflatable impression packer into said well tubular member, said working inflatable impression packer having substantially the same operating characteristics and dimensions as said test inflatable impression packer, inflating said working inflatable impression packer at substantially the same pressure and for substantially the same time as said test inflatable impression packer to form a well extrusion by extruding impression material into said flow opening, deflating said working inflatable impression packer, removing said working inflatable impression packer from said well tubular member and determining the actual size of said flow opening in said well tubular member by comparing said well extrusion to said plurality of test extrusions.

* * * * *